(12) United States Patent
Nagaoka

(10) Patent No.: US 6,630,090 B1
(45) Date of Patent: Oct. 7, 2003

(54) CONTINUOUS INJECTION MOLDING METHOD

(75) Inventor: Tsutomu Nagaoka, Tokyo (JP)

(73) Assignee: Kobe Steel, Ltd., Kobe (JP)

( * ) Notice: Subject to any disclaimer, the term of this patent is extended or adjusted under 35 U.S.C. 154(b) by 356 days.

(21) Appl. No.: 09/612,498

(22) Filed: Jul. 7, 2000

(30) Foreign Application Priority Data

Jul. 9, 1999 (JP) .......................................... 11-195794

(51) Int. Cl.[7] .............................................. B29C 45/16
(52) U.S. Cl. ................................... 264/255; 264/328.8
(58) Field of Search .............................. 264/255, 328.8, 264/513, 537, 40.1; 425/129.1, 130, 572, 573

(56) References Cited

U.S. PATENT DOCUMENTS

| | | | |
|---|---|---|---|
| 4,052,497 A | * 10/1977 | Monnet ....................... 264/245 |
| 5,028,226 A | * 7/1991 | De'ath et al. ................ 425/130 |
| 5,049,345 A | * 9/1991 | Collette et al. .............. 264/255 |
| 5,143,733 A | * 9/1992 | Von Buren et al. ..... 264/328.13 |
| 6,074,190 A | 6/2000 | Nagaoka et al. |

FOREIGN PATENT DOCUMENTS

| | | |
|---|---|---|
| GB | 2 318 759 | 5/1998 |
| JP | 2-99309 | 4/1990 |
| KR | 1998-033251 | 7/1998 |

* cited by examiner

*Primary Examiner*—Angela Ortiz
(74) *Attorney, Agent, or Firm*—Oblon, Spivak, McClelland, Maier & Neustadt, P.C.

(57) ABSTRACT

The injection molding method according to the present invention selectively carries out a single layer molding operation in which injection units for measuring resins while plasticizing the former to inject them to a cavity part are connected together, and only desired resins in one of the injection units are injected into the cavity part to thereby mold a single layer molded product; and a multi-layer molding operation in which mixed resins formed when resins are changed in one of the injection units are injected into the cavity part so as to constitute a core layer, and desired resins in the other of the injection units are injected into the cavity part so as to constitute a skin layer thereby molding a molded product of a multilayer construction. With this, even where the mixed resins formed at the time of switching the resins are used as materials for molded products, no inconvenience occurs on the surface of the molded products, and molding by the mixed resins can be carried out along with the switching operation of the resins.

10 Claims, 15 Drawing Sheets

F I G. 3A
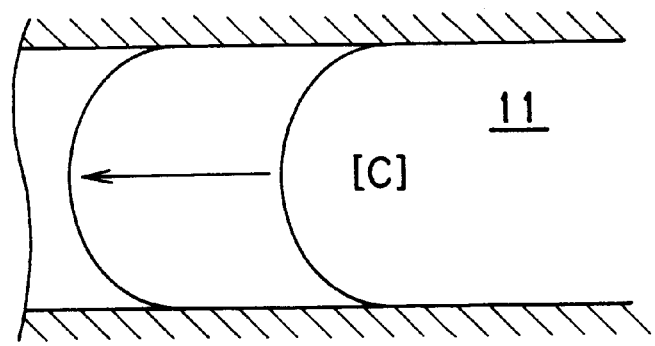
F I G. 3B
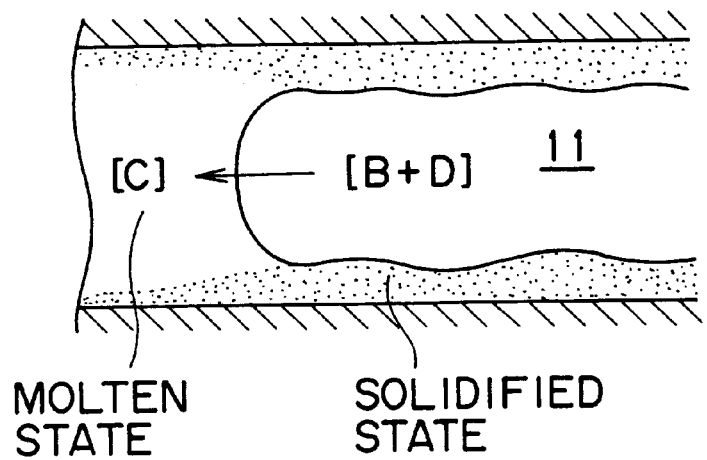

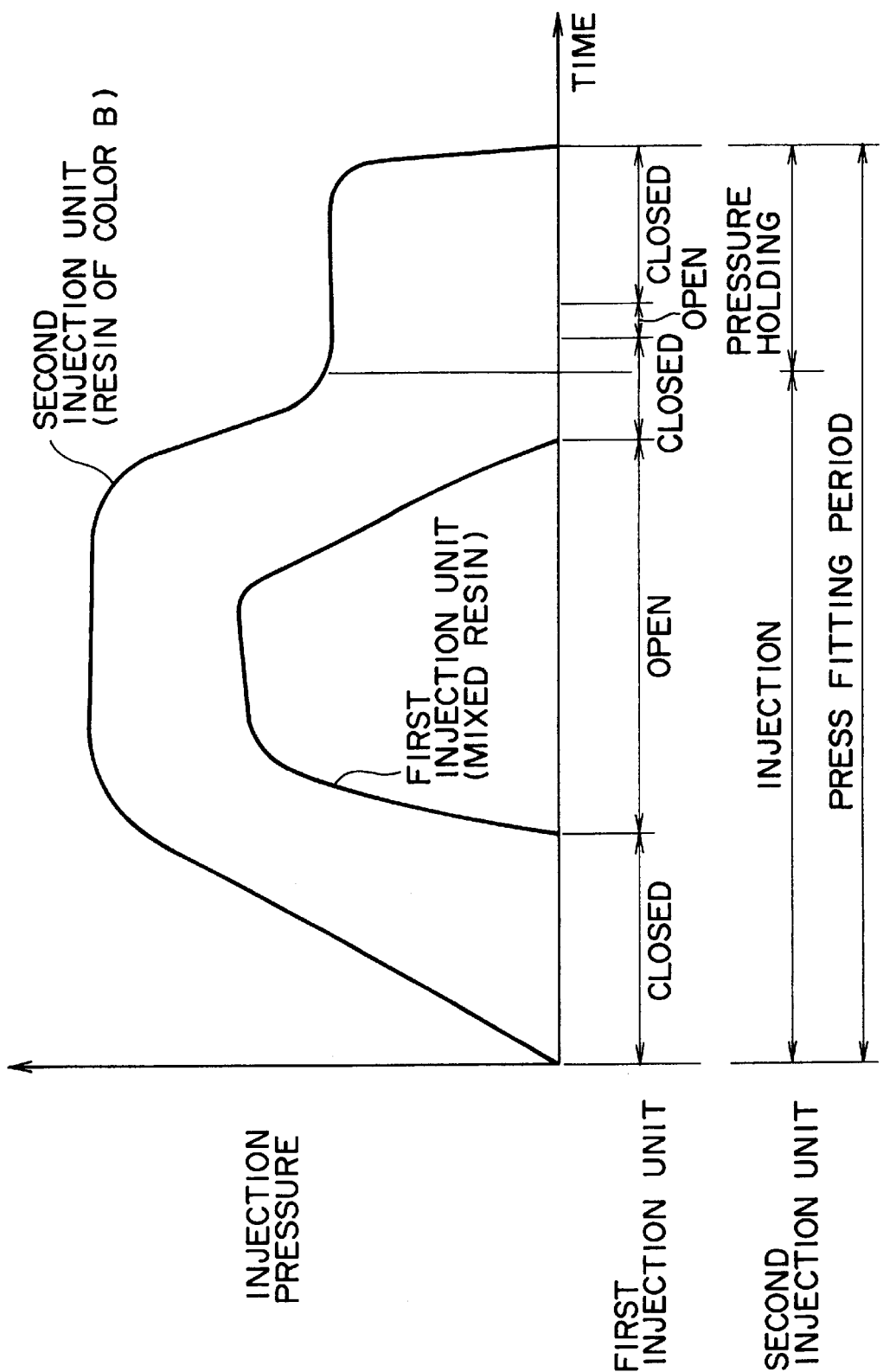

F I G. 11
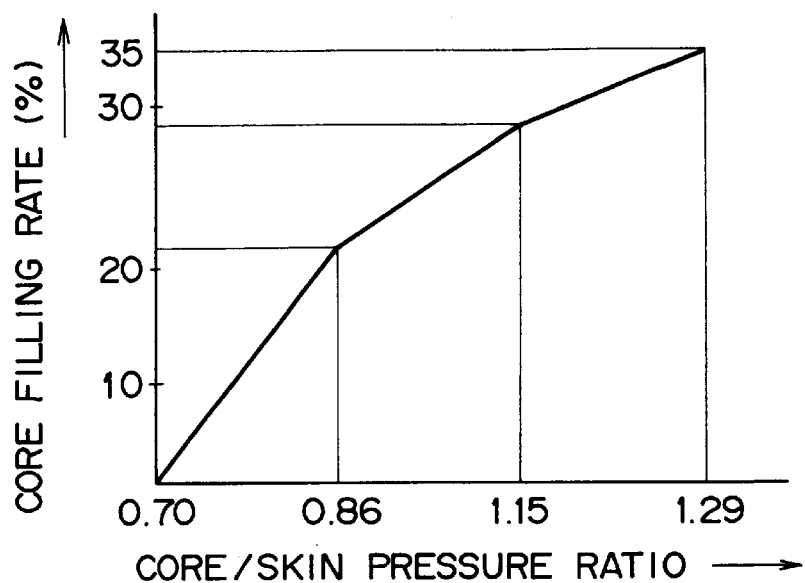
F I G. 12
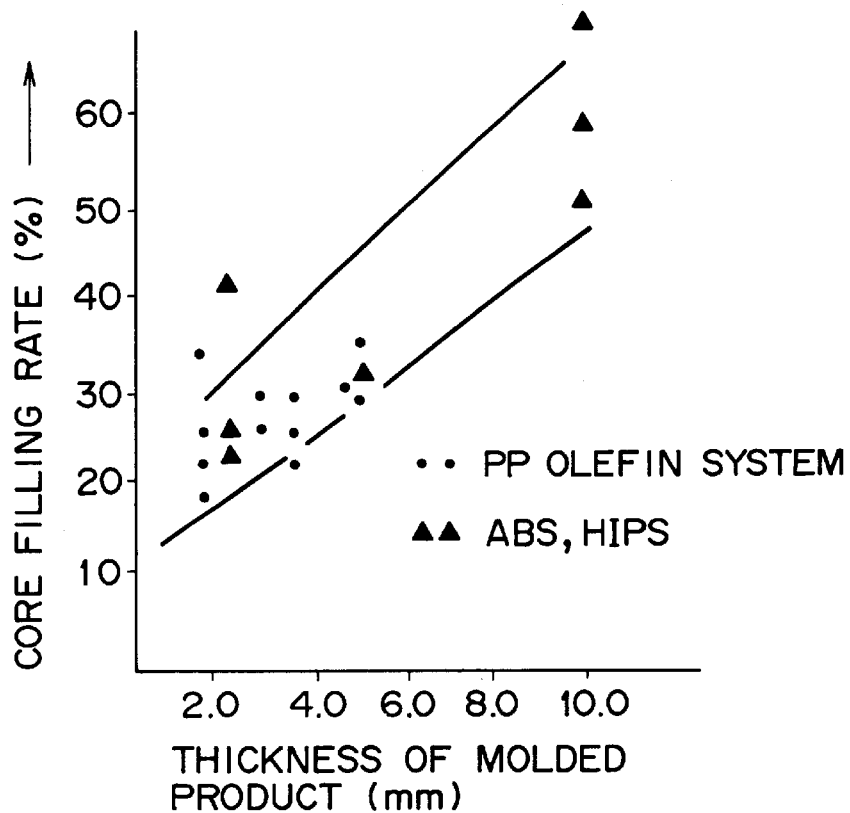

CONTINUOUS INJECTION MOLDING METHOD

BACKGROUND OF THE INVENTION

1. Field of the Invention

The present invention relates to an injection molding method for carrying out injection molding so as to allow a mixed resin formed when a variety is changed present within a molded product, and a molding machine.

2. Description of the Related Art

In the injection molding machine, generally, as shown in FIG. 16, resins are supplied from a hopper 52 into a cylinder barrel 51, a screw 53 is rotated to deliver the resins forward while plasticizing the latter, and the screw 53 is moved back. When a fixed quantity of resins are measured according to a position of the screw, the rotation of the screw 53 is stopped and moved forward whereby the resins measured are extruded from a nozzle part 51a into a metal mold not shown to carry out injection molding.

However, where the variety of the molded product is changed as in changing color, it is necessary that the resins within the cylinder barrel 51 be completely replaced with new resins so as not to be affected by the resins before changed. Accordingly, in the past, from a viewpoint of workability and productivity, conventionally, new resins are supplied through the hopper 52, and the screw 53 is rotated and/or moved forward and backward so that the resins before changed are extruded by new resins and discharged outside the machine. When the resins before changed are completely discharged outside the machine, by replacement such an operation as described above, replacing is completed and injection molding for next molded products is carried out.

However, in the above-described method, it is necessary that a large quantity of resins from 10 to 100 shots are discharged outside the machine till the resins within the cylinder barrel 51 are completely replaced. Since the resins to be discharged outside the machine are in the state of mixed resins in which new and old resins are mixed so that colors are mixed, when they are used as materials for molded products, an inconvenience such as a color mixture appears on the surface of the molded products. Therefore, in the past, a large quantity of resins (mixed resins) are to be abandoned taking much time every change of the variety of molded products such as color changing, resulting in an increase of cost of molded products due to an increase in material loss and a lowering of the working rate of the machine in actual molding.

SUMMARY OF THE INVENTION

It is an object of the present invention to provide an injection molding method and a molding machine wherein even where mixed resins formed when resins are replaced are used as materials for molding products, no inconvenience appears on the surface of the molded products, and molding using the mixed resins can be carried out together with the operation of changing the resins.

The injection molding method according to the present invention selectively carries out a normal molding operation in which injection units are connected together which measures resins while plasticizing the latter and injects into a cavity part, and only desired resins in one of the injection units are injected into the cavity part to thereby mold a single layer molded product; and a multilayer molding operation in which mixed resins formed when resins are changed in one of the injection units are injected into the cavity part so as to constitute a core layer, and desired resins in the other of the injection units are injected into the cavity part so as to constitute a skin layer thereby molding a molded product of a 3-layer construction.

In this case, when the mixed resins are formed due to the changing of resins, the mixed resins are transferred to the multilayer molding operation for molding the molded products of the 3-layer construction using the core layer to thereby enable obtainment of molded products having the surface of the skin layer comprising desired resins without appearance of the inconvenience resulting from the mixed resin on the surface of the molded products. Since this molding of molded products is carried out by injecting the mixed resins to discharge the latter into the core layer of the molded product, that molding can be carried out together with the operation of changing resins. Thereby, it is possible to obtain molded products using the mixed resins in conjunction with the operation of changing resins, and therefore, it is possible to obtain molded products at less cost by the reduction in material loss and the enhancement of the working rate of the machine in the actual molding, as compared with the conventional case where a large quantity of resins (mixed resins) are abandoned taking much time.

The above-described multilayer molding operation comprises enabling supplying and receiving resins between the injection units plasticizing the mixed resins in one of the injection units and measuring the latter so as to have a shot part corresponding to the core layer, supplying, after the desired resins have been plasticized in the other of the injection units, the resins to one of the, injection units so as to have a shot part corresponding to the skin layer, and injecting the desired resins and the mixed resins into the cavity part in said order from one of the injection units to thereby mold the molded products of the 3-layer construction.

In this case, when the desired resins and the mixed resins are injected into the cavity part in said order, the desired resins injected first are cooled from the wall surface of the cavity part and solidified. Accordingly, when the mixed resins are then injected, the mixed resins flow along the inside part corresponding to the soft core layer of the desired resins whereby the desired resins are press fitted deeply into the cavity part in the state that the desired resins contain the mixed resins therein. Accordingly, when the total quantity of the mixed resins are injected into the cavity part, there assumes a 3-layer construction in which the desired resins are present on both sides of the mixed resins, and therefore, it is possible to obtain molded products of a 3-layer construction in which the mixed resins of the core layer are covered with the desired resins of the skin layer. According to the above-described injection molding method, it is possible to obtain the molded products of a 3-layer construction without connecting the injection units together using a special mechanism, thus reducing the cost of apparatus.

Further, the aforementioned multilayer molding operation comprises connecting the injection units so as to be capable of changing into a flow path for a core layer used for forming a core layer and a flow path for a skin layer used for forming a skin layer, measuring the mixed resins so as to have a shot part corresponding to the core layer while plasticizing the mixed resins in one of the injection units, connecting the injection unit to the flow path for a core layer, measuring the desired resins so as to have a shot part corresponding to the skin layer while plasticizing the desired resins in the other of the injection units, connecting the injection unit to the flow path for a skin layer, and injecting the mixed resins in one of the injection units and the desired resins in the other of the injection units into the cavity part through the flow path for a core layer and the flow path for a skin layer, respectively, to thereby mold the molded products of a 3-layer construction.

In this case, by the simple operation that the connecting state of the injection units is changed relative to the flow path for a core layer and the flow path for a skin layer, it is possible to easily obtain the molded products of a 3-layer construction with the mixed resins in one of the injection unit being a core layer.

By the above-described injection molding method, the molded products are formed so as to have the mixed resins as a core layer, and the molded products are formed so as to have the mixed resins as a core layer in the range of 5 to 65% relative to the total weight.

Next, the injection molding machine according to the present invention for realizing the aforementioned injection molding method comprises an injection unit connecting device for connecting injection units together for measuring resins while plasticizing the latter to inject them into a cavity part; and a control device for selectively carrying out a normal molding operation for injecting only the desired resins in one of the injection units into the cavity part to thereby mold a single layer molding product, and a multi-layer molding operation for injecting the desired resins in the other of the injection units into the cavity part so as to be a skin layer to thereby mold molded products of a 3-layer construction, wherein the injection unit connecting device comprises a flow path for a core layer used for forming the core layer, a flow path for a skin layer used for forming the skin layer, and a switching mechanism for connecting the injection units capable of changing to either the flow path for a core layer or the flow path for a skin layer, and the control device controls the switching mechanism so that in the multilayer molding operation, one of the injection units is connected to the flow path for a core layer, and the other of the injection units is connected to the flow path for a skin layer.

In this case, the molded products of a 3-layer construction with the mixed resin in one of the injection units being a core layer can be easily obtained by the simple constitution.

BRIEF DESCRIPTION OF THE DRAWINGS

FIGS. 3A to 3B are explanatory views showing the state of resins injected into a cavity part, FIG. 3A showing the flowing state of C color resins, and FIG. 3B showing the flowing state of B–D color mixed resins;

FIG. 4 is an explanatory view showing the press fitting state by each injection unit;

FIG. 11 is a graph showing a relationship between the core filling rate and the core/skin pressure ratio;

FIG. 12 is a graph showing a relationship between the core filling rate and the thickness of molded products;

DETAILED DESCRIPTION OF THE PREFERRED EMBODIMENTS (Embodiment 1)

A first embodiment of the present invention will be described hereinafter with reference to FIGS. 1 to 10.

Figure 5:
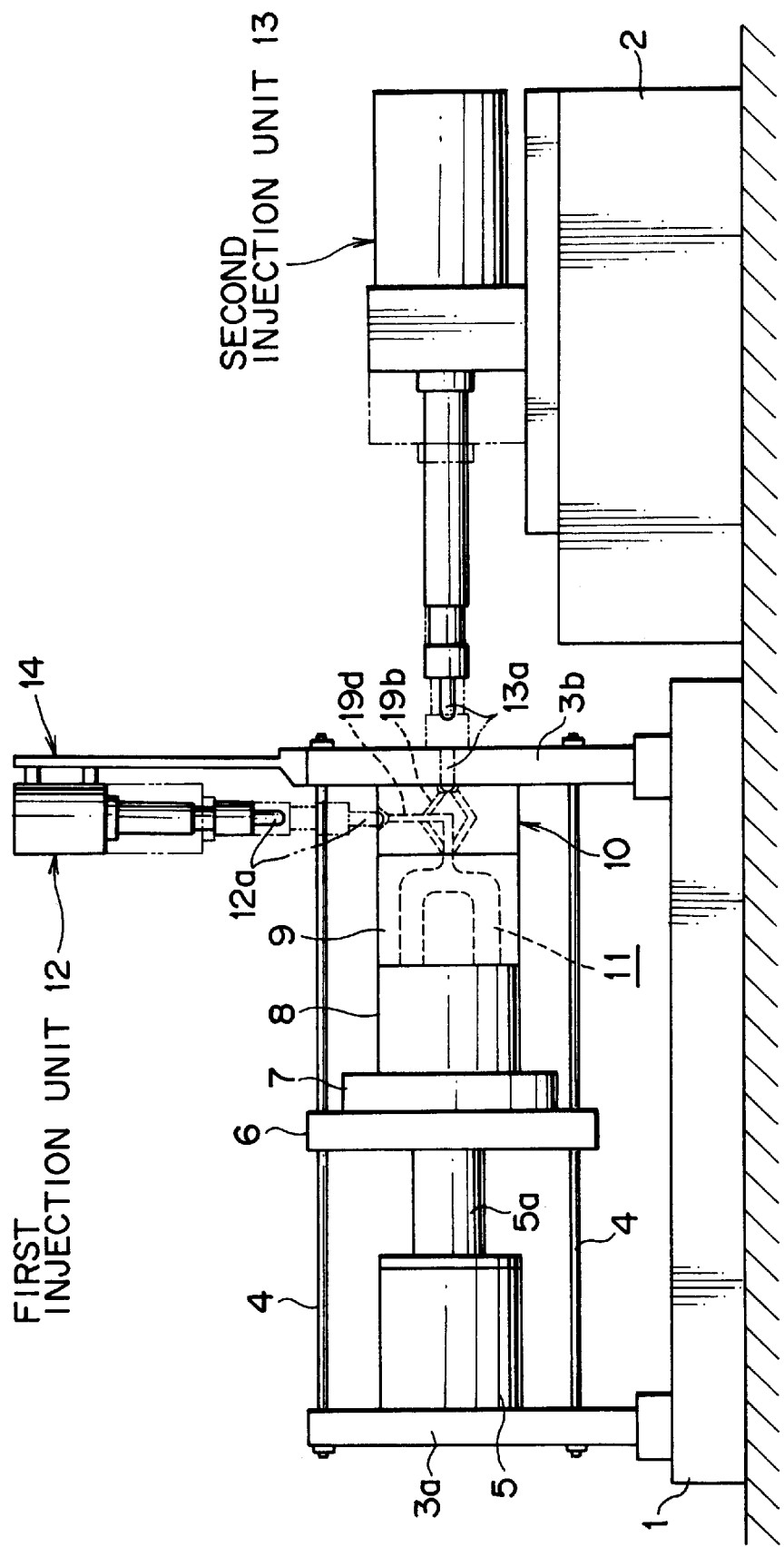
FIG. 5 is a schematic constituent view of the injection molding machine.

The molding machine for carrying out the injection molding method of the present invention has, as shown in FIG. 5, a clamping base 1 and an injection unit place bed 2. Support members 3a and 3b are longitudinally provided on opposite ends of the clamping base 1. Between the support members 3a and 3b, rod-like guide members 4 . . . are laterally provided at corner parts. A metal mold opening and closing cylinder 5 is provided on one support member 3a located on the left side in the figure so that a cylinder rod 5a is opposed to the support member 3b on the other side. A guide engaging member 6 is provide at the extreme end of the cylinder rod 5a. The guide members 4 . . . are slidably extended through the corner parts of the guide engaging member 6, and the guide member 4 causes the guide engaging member 6 to move along the guide members 4 . . . to thereby control the forward and backward directions of the cylinder 5 by the cylinder rod 5a.

A movable metal mold 8 is provided on the guide engaging member 6 through a template 7. A fixed metal mold 9 is opposed to the movable metal mold 8, and the fixed metal mold 9 is connected to the back surface of an injection unit connecting device 10. The connecting device 10 has an outer peripheral portion of the front surface fixedly mounted on the support member 3b on the other side. Thereby, the fixed metal mold 9 assumes a state that is fixedly mounted on the support member 3b on the other side through the connecting device 10. The movable metal mold 8 and the fixed metal mold 9 are such that the movable metal mold 8 is placed in contact with the fixed metal mold 9 by the cylinder 5 and is clamped to form a cavity part 11 therein.

Figure 2A:
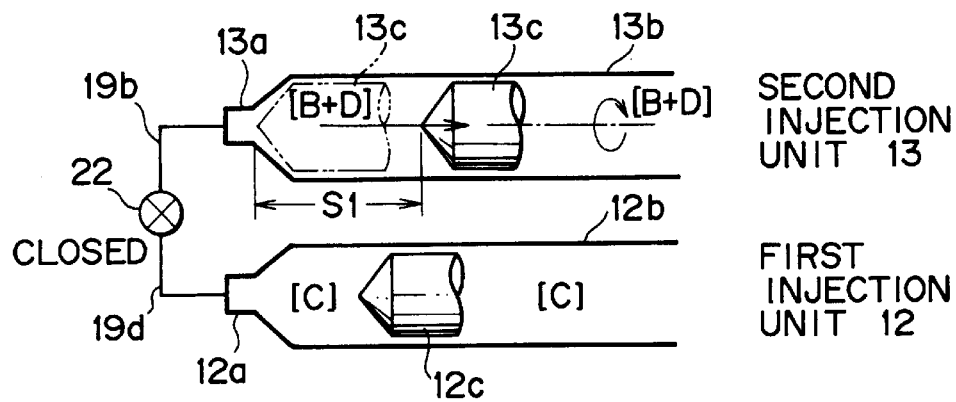
FIGS. 2A to 2C are explanatory views showing the process of injection molding, FIG. 2A, FIG. 2B, and FIG. 2C showing the state of plasticizing and measuring B–D color mixed resins, the state of reversely flowing C color resins, and the state of injecting C color resins and B–D color mixed resins, respectively.

Mixed resins and normal resins (after changed) formed when the variety is changed are supplied from a first injection unit 12 and a second injection unit 13, to the cavity part 11. The injection units 12 and 13 have, as shown in FIG. 2A, cylindrical cylinder barrels 12b and 13b provided with nozzle parts 12a and 13a at the extreme end, screws 12c and 13c provided rotatably and movably forward and backward within the cylinder barrels 12b and 13b, and a position detector (not shown) for detecting a screw position when the screws 12c and 13c are moved forward and backward.

The first injection unit 12 is provided on a slide mechanism 14 fixedly mounted on the upper surface of the support member 3b, as shown in FIG. 5. The slide mechanism 14 supports the first injection unit 12 vertically movably so that the diametrically central part of the nozzle part 12a of the first injection unit 12 is perpendicular to the clamping direction, and when the resins are supplied to the cavity part 11, the nozzle part 12a of the first injection unit 12 is placed in contact with the side of the injection unit connecting device 10.

On the other hand, the second injection unit 13 is provided movably forward and backward on the injection unit place bed 2 so that the diametrically central part of the nozzle part 13a is parallel with the clamping direction, and when the resins are supplied to the cavity part 11, the nozzle part 13a is placed in contact with the front surface of the injection unit connecting device 10. While in the present embodiment, the first injection unit 12 is mounted on the second injection unit 13 in the attitude of being arranged vertically, it is to be noted that the first injection unit 12 may be mounted in the attitude of being arranged horizontally.

Figure 6:
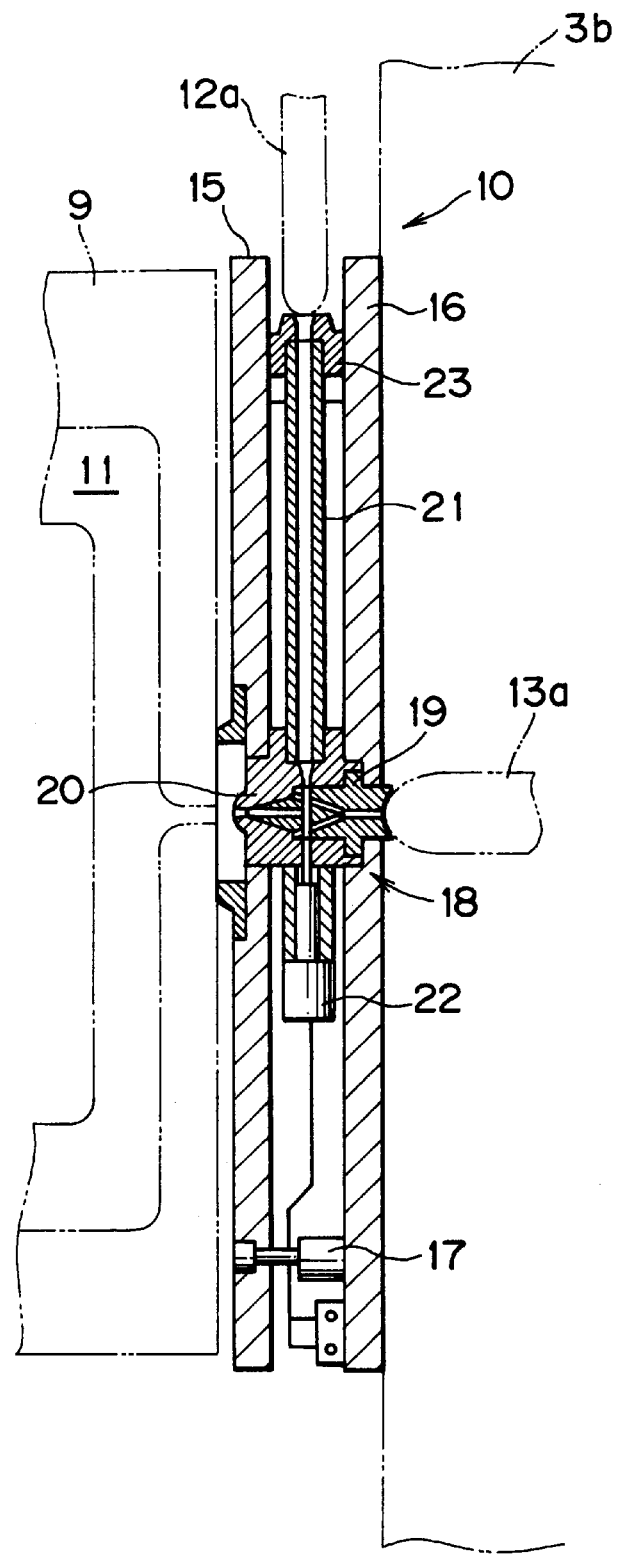
FIG. 6 is a longitudinal sectional view of an injection unit connecting device.

The injection unit connecting device 10 with which the nozzle parts 12a and 13a are placed in contact has, as shown in FIG. 6, a metal mold joining plate 15 joined to the fixed metal mold 9, and a fixed plate 16 fixedly mounted on the support member 3b. The metal mold joining plate 15 and the fixed plate 16 are fastened through a plurality of bolts not shown so that they are opposed in a fixed spaced relation. Between the metal mold joining plate 15 and the fixed plate 16 is provided a resin layer forming mechanism 18 for supplying, so that the circumference of resins flowing through the flow path for a core layer 19d are covered with resins flowing through the flow path for a skin layer 19b, both the resins to the cavity part 11 while gathering them.

Figure 7:
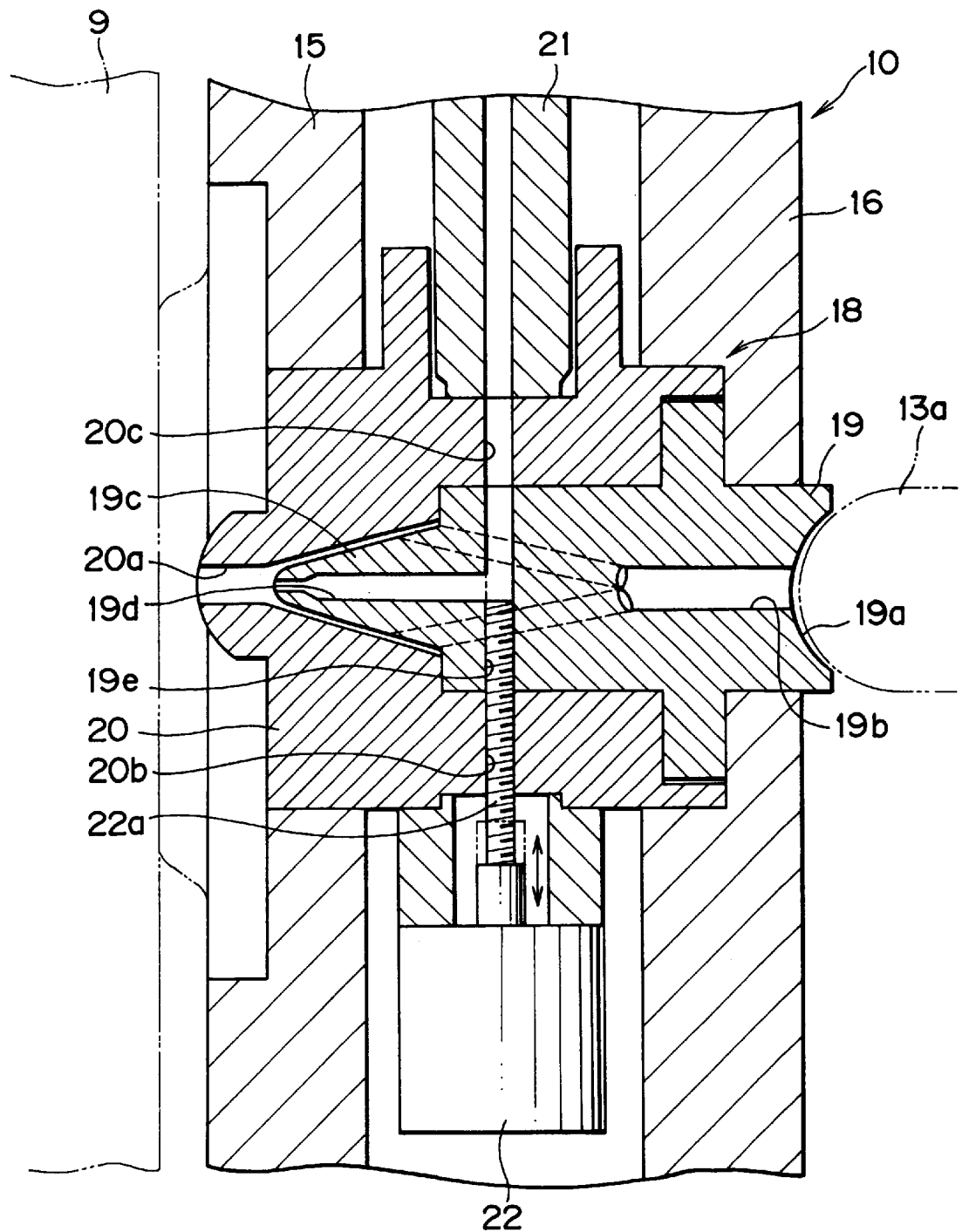
FIG. 7 is a sectional view of showing main parts of the injection unit connecting device in an enlarged scale.

The resin layer forming mechanism 13 has, also as shown in FIG. 7, a male-side laminate member 19, a female-side laminate member 20, a resin introducing member 21, and a flow path opening and closing valve 22. The male-side laminate member 19 extends through the center of the fixed plate 16, the extreme end of which is placed in contact with the nozzle part 13a of the second injection unit 13. The male-side laminate member 19 is formed at the extreme end with a recessed curve part 19a so as to be placed in contact with the extreme end of the nozzle part 13a in a facing manner. To the center (bottom) of the recessed curve part 19a is opened one end of the flow path for a skin layer 19b for allowing the resins from the nozzle part 13a pass therethrough. The flow path for a skin layer 19b is formed so that the skin layer 19 is formed in the direction of the diametrically central part of the male-side laminate member 19, then branched into plural directions (for example, four directions) about the diametrically central part, and opened at a plurality of parts of the wall surface on the other side.

An inclined convex part 19c formed into a conical shape is formed on the other side of the male-side laminate member 19 where the flow path for a skin layer 19b are opened to a plurality of parts. The flow path for a skin layer 19b is opened to the inclined wall surface of the inclined convex part 19c. One end of the flow path for a core layer 19d is opened to the top of the inclined convex part 19c, and the flow path for a core layer 19d is formed in the direction of the diametrically central part of the male-side laminate member 19 (inclined convex part 19c) is formed in the direction of the diametrically central part, then bent at right angles at the center position of the metal mold joining plate 15 and the fixed plate 16, and opened to the side wall surface passing between branch paths of the flow path for a skin layer 19b. A closed path 19e is communicated with the bent part of the flow path for a core layer 19d, the closed path 19e being opened to the side wall surface in the direction opposite to the bending direction of the flow path for a core layer 19d.

The male-side laminate member 19 is fitted in the female-side laminate member 20. The female-side laminate member 20 extends through the center of the metal mold joining plate 15, and one end of a gathering path 20a is opened to the extreme end on the side of the fixed metal mold 9 of the female-side laminate member 20. The gathering path 20a is formed in the direction of the inclined convex part 19c, and then closed at the end of the male-side laminate member 19 while enlarging an aperture so as to maintain fixed intervals with respect to the inclined wall surface of the inclined convex part 19c. One ends of a flow path for a core layer 20c and a closed path 20b are opened to the side wall of the female-side laminate member 20, and the other ends of the flow path for a core layer 20c and the closed path 20b are communicated with the flow path for a core layer 19d an the closed path 19e, respectively, of the male-side laminate member 19. The flow path for a core layer 20c, the flow path for a core layer 19d after bent, the closed path 19e and the closed path 20b are communicated as described above whereby a linear through-hole is formed at right angles to the clamping direction over the male-side laminate member 19 and the female-side laminate member 20.

On the side wall surface on one side of the female-side laminate member 20 is fixedly mounted a pipe-shaped resin introducing member 21 so as to be communicated with the flow path for a core layer 20c. The resin introducing member 21 is formed so as to reach the outer peripheral portion from the center on the side of the female-side laminate member 20 between the metal mold joining plate 15 and the fixed plate 16, as shown in FIG. 6, and an adapter member 23 is provided on the end of the outer peripheral portion. The nozzle part 12a of the first injection unit 12 is placed in contact with the adapter member 23.

A flow path opening and closing valve 22 formed, for example, from a hydraulic cylinder, is provided on the side wall surface on the other side of the female laminate member 20. This valve 22 has a closed plug member 22a which is movable forward and backward, as shown in FIG. 7, the closed plug member 22a being is inserted liquid-tightly into closed paths 20b and 19e. The valve 22 places the flow path for a core layer 19d in a closed state at the bent part by moving the closed plug member 22a forward whereas placing the flow path for a core layer 19d in an open state by moving the closed plug member 22a backward. The extreme end of the dosed plug member 22a is in the form of a curved surface corresponding to the bent radius of the flow path for a core layer 19d, and when the flow path for a core layer 19d is opened, the flowing resistance of the resins at the bent part is reduced.

The injection unit connecting device 10 and the first and the second injection units 12 and 13 shown in FIG. 5 are controlled by a control unit not shown. The control unit is possible to execute a first control operation (normal molding operation) for injecting only resins of the first injection unit 12 into the cavity part 11 to thereby mold a single layer molded product, a second control operation (plural-layer molding operation) for molding mixed resins in the first injection unit 12 and resins in the second injection unit 13 into molded products of a 3-layer construction as a core layer and a skin layer, respectively, a third control operation (normal molding operation) for injecting only the resins in the second injection unit 13 to the cavity part 11 to thereby a first layer molded product, and a fourth control operation (plural-layer molding operation) for molding mixed resins in the first injection unit 12 and resins in the second injection unit 13 into molded products of a 3-layer construction as a core layer and a skin layer, respectively.

In the above-described constitution, the operation of the injection molding machine will be described below. While in the following description, a description will be made of the case where colors of resins and pigments are changed in order of color A, color B, color C, and color D to thereby change the varieties (colors), it is to be noted that the present invention is not limited thereto, but can be also applied to the case where kinds of resins are changed to thereby change the varieties (performance, quality, etc.) of molded products.

First, resins of color A used for the first variety of molded products are charged into the hopper of the first injection unit 12. Then, when a fixed quantity of the resins of color A is charged, a molding start switch not shown is depress fitted to thereby execute the first control operation by the control device to allow the first injection unit 12 to carry out injection molding. In this injection molding, resins of color B used for the second variety of molded products are then charged into the hopper of the second injection unit 13.

The above-described first control operation will be described in detail. First, the movable metal mold 8 is moved in the direction of the fixed metal mold 9 by the metal mold opening and closing cylinder 5, and the movable metal mold 8 is press fitted against the fixed metal mold 9 by the fixed pressing force to carry out clamping. When the cavity part 11 is formed within the metal molds 8 and 9 by the clamping, the screw 12*c* shown in FIG. 2A is placed to be movable forward and backward and rotated whereby the resins of color A are plasticized while drawing them into the cylinder barrel 12 from the hopper and heated and molten, and moved forward in the direction of the nozzle part 12*a*. The screw 12*c* is moved backward by the pressing force of the resins of color A while receiving the plasticized resins of color A between the extreme end of the screw 12*c* and the nozzle part 12*a*, and a position of the screw is detected by a position detector to measure the quantity received. In the first plasticization and measurement, the flow path for a core layer 20*c* is closed by the flow path opening and closing valve 22 to thereby prevent the resins of color A from leaking.

When a judgment is made that the resins of color A plasticized by the measurement are one shot portion, the rotation of the screw 12*c* is stopped. Thereafter, the screw 12*c* is moved forward so as to be returned to a position before backward movement whereby the resins of color A are injected out of the nozzle part 12*a* and press fitted into the cavity part 11 through the flow path for a core layer 19*d* in the open state in the injection unit connecting device 10. Then, when in the cavity part 11, the resins of color A are cooled while holding them to have mold holding properties after passage of fixed cooling time, both the metal molds 8 and 9 are opened to take out molded products formed of only the resins of color A. During the period of cooling, resins of color A for next shot portion are plasticized and measured in the first injection unit 12 by the aforementioned operation, and when both the metal molds 8 and 9 are again clamped, they are injected. By repeating such operation as described, single-layer molded products formed of only the resins of color A are produced sequentially.

Next, the production of molded products of the first variety (color A) by the first injection unit is changed to the production of molded products of the second variety (color B) by the second injection unit, and preparation is made so that molding products of the third variety (color C) can be produced in the first injection unit.

That is, after the resins of color C have been charged into the hopper of the first injection unit which have received the resins of color A, the control device is caused to execute the second control operation, as shown in FIG. 4. The control device executes the second control operation, and first, in the first injection unit 12, mixed resins of colors A–C in which the resins of color A remained in the hopper and resins of color C charged newly are mixed are plasticized, and measured so as to be a shot portion corresponding to the core layer positioned in the middle portion of the molded products of a 3-layer construction. Further, in the second injection unit 13, the resins of color B are plasticized, and the resins of color B are measured so as to have a shot portion corresponding to the skin layers positioned on the surface side and the back side of the products of a 3-layer construction.

Next, the resins of color B are injected from the second injection unit 13 prior to the mixed resins of colors A–C in the first injection unit 12. The resins of color B injected out of the second injection unit 13 flow into the flow path for a skin layer 19*b* of the male-side laminate member 19 in the injection unit connecting device 10 through the nozzle part 13*a*, and move forward while being branched in plural directions in the flow path for a skin layer 19*b*. Then, as shown in FIG. 7, the resins of color B further move forward through the flow path for a skin layer 19*b*, flow into a clearance between the inclined convex part 19*c* of the male-side laminate member 19 and the gathering path 20*a* of the female-side laminate member 20, and flow in the direction of the fixed metal mold 9 while completely covering the inclined wall surface of the inclined convex part 19*c*.

On the other hand, after passage of the fixed waiting time after the resins of color B have been injected, the closed member 22*a* of the flow path opening and closing valve 22 is moved backward to thereby close the flow path for a core layer 19*d*. Then, the mixed resins of colors A–C are injected out of the first injection unit 12. The mixed resins of colors A–C flow into the flow paths for a core layer 20*c* and 19*d* of the female-side laminate member 20 and the male-side laminate member 19, respectively, through the resin introducing member 21, and the moving direction is bent by the extreme end of the closed member 22*a*, after which the resins flow out of the extreme end of the inclined convex part 19*c*. In this case, at the extreme end of the inclined convex part 19*c*, the resins of color B previously injected gather along the inclined wall surface of the inclined convex part 19*c*. Accordingly, the mixed resins of colors A–C flown out of the extreme end of the inclined convex part 19*c* are press fitted into the cavity part 11 of the fixed metal mold 9 passing through the gathering path 20*a* together with the resins of color B while being completely covered in their periphery with the resins of color B.

A relationship between the injection pressure of the mixed resins of colors A–C to be a core layer and the injection pressure of the resins of color B to be a skin layer can be suitably determined according to the shape of molded products or the like. That is, as shown in FIG. 11, according to the investigation of a relationship between the core/skin pressure ratio and the core filling rate, it has been confirmed that the core layer can be filled on either side of the reducing side (skin layer is on the high pressure side) and the increasing side (core layer is on the high pressure side) relative to the core/skin pressure ratio=1.0 showing that the pressure of the core layer is equal to that of the skin layer.

Thereafter, the mixed resins of colors A–C and the resins of color B are press fitted in a unit of fixed quantity so that press fitting of the mixed resins of colors A–C is completed earlier than that of the resins of color B, and when the injection molding for one shot portion is completed, the closed member 22a of the flow path opening and closing valve 22 is moved forward to thereby place the flow path for a core layer 19d in a closed state. After this, the flow path for a core layer 19d is placed in an open state temporally, and the resins of color B and the mixed resins of colors A–C in the cavity part 11 are cooled by the injection pressure of the second injection unit 13 while maintaining pressure. When the mold holding properties are provided after the passage of the fixed cooling time, both the metal molds 8 and 9 are opened to take out the molded products of a 3-layer construction in which the mixed resins of colors A–C are covered with the resins of color B. Further, during the period of cooling, the mixed resins of colors A–C and the resins of color B for a next shot portion are plasticized and measured in the injection units 12 and 13, respectively, by the aforementioned operation, and when both the metal molds 8 and 9 are again clamped, they are injected. By repeating such an operation as described, the second variety (color B) of the molded products of a 3-layer construction in which the mixed resins of colors A–C are covered with the resins of color B are produced sequentially.

Thereafter, where a judgment is made that all the mixed resins of colors A–C are used up on the basis of the shot number or the like, the present second control operation is completed, and the third control operation for molding molded products of a single layer merely formed by the resins of color B in the second injection unit 13 is carried out.

That is, the flow path for a core layer 19d is placed in a closed state so that the resins of color B from the second injection unit 13 are not reversed to the first injection unit 12. Thereafter, in the second injection unit 13, the resins of color B for one shot portion are plasticized and measured, after which they are injected, whereby they are press fitted into the cavity part 11 through the flow path for a skin layer 19b. Then, the resins of color B are cooled while holding them in the cavity part 11, and when the mold holding properties are provided after passage of the fixed cooling time, both the metal molds 8 and 9 are opened to take out the molded products merely formed of the resins of color B. During the period of cooling, the resins of color B for a next shot portion are plasticized and measured, and when both the metal molds 8 and 9 are again clamped, they are injected. By repeating such an operation as described, the molded products of a single layer merely formed of the resins of color B are produced sequentially.

Next, the production of molded products of the second variety (color B) by the second injection unit 13 is changed to the production of molded products of the third variety (color C) by the first injection unit 12, and preparation is made so that molding products of the fourth variety (color D) can be produced in the second injection unit 13.

Figure 1:
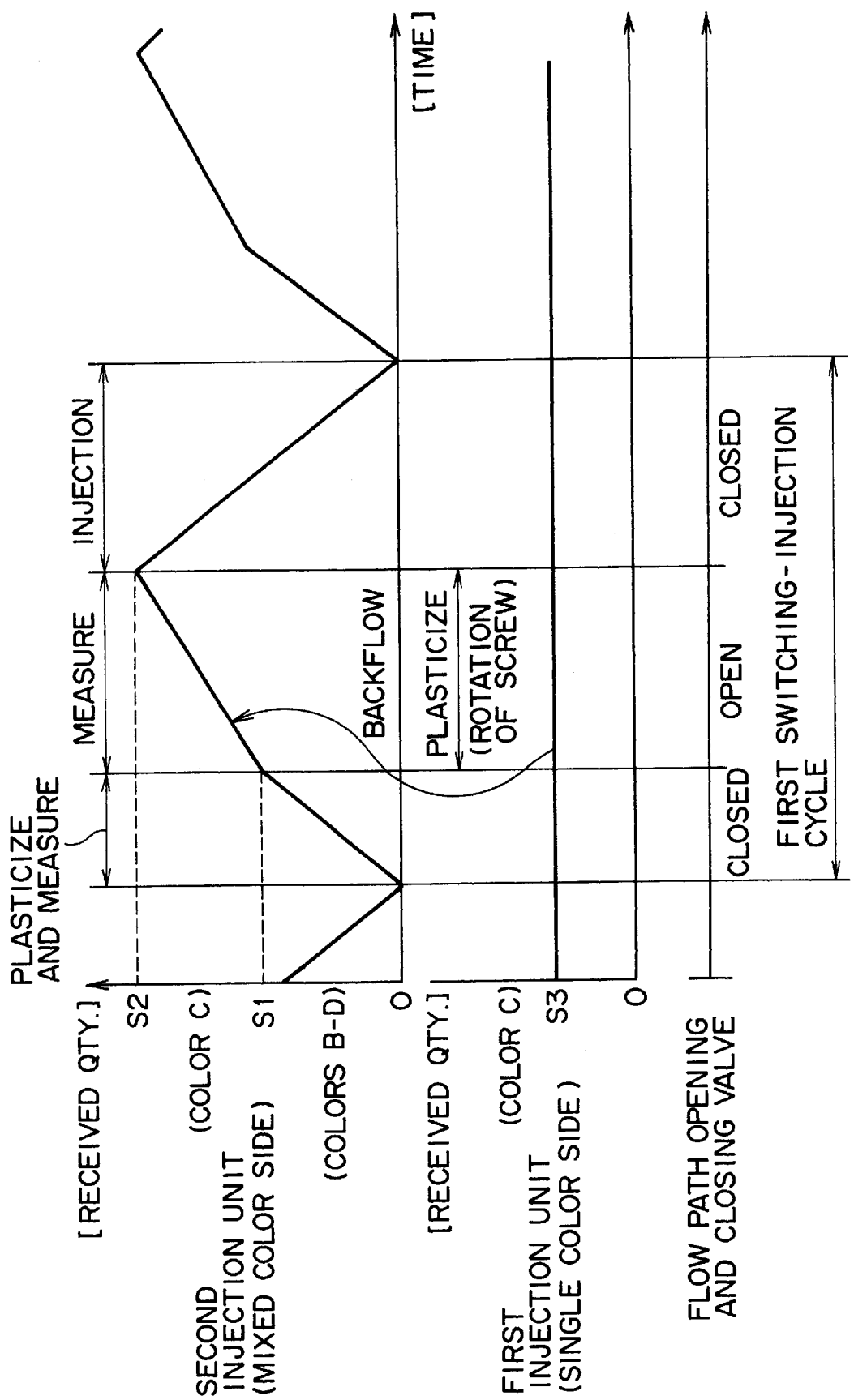
FIG. 1 is an explanatory view showing the operating state of the injection molding machine according to the present invention.

That is, after the resins of color D have been charged into the hopper of the second injection unit 13 which have received the resins of color B, the control device is caused to execute the fourth control operation, as shown in FIG. 1. When the control device executes the fourth control operation, first, the flow path for a core layer 19d is placed in a closed state by the flow path opening and closing valve 22, after which in the second injection unit 13, the screw 13c is made movable and rotated whereby mixed resins of colors B–D in which the resins of color B remained in the hopper and newly charged resins of color D are mixed are plasticized, and measured so as to provide a shot portion (received quantity S1) corresponding to a core layer positioned in the middle portion of the molded products of a 3-layer construction.

Figure 2B:
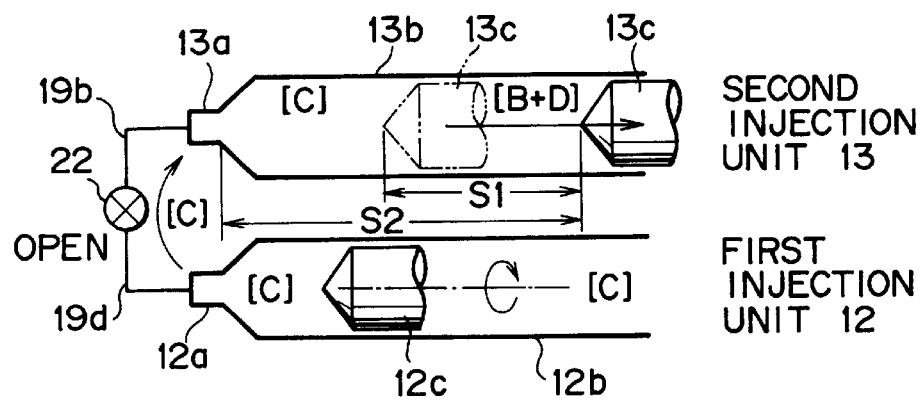

When the measurement of the mixed resins of colors B–D is completed, the rotation of the screw 13c is stopped with the latter remains movable to complete the plasticization of the mixed resins. After the flow path for a core layer 19d has been placed in an open state, as shown in FIG. 2B, the screw 12c of the first injection unit 12 is rotated in a state that the screw 12c is fixed to a predetermined screw position to thereby plasticize the resins of color C. Since the screw 12c of the first injection unit 12 is fixed while the screw 13c of the second injection unit 13 is movable, the plasticized resins of color C flow into the flow path for a skin layer 19b through the gathering path 20a shown in FIG. 7 from the flow path for a core layer 19d, after which reversed to the second injection unit 13. The screw 13c is moved backward together with the mixed resins of colors B–D by the reversed resins of color C, and when a judgment is made on the basis of the screw position that the total quantity of the resins of color C and the mixed resins of colors B–D is one shot portion (received quantity S2), the rotation of the screw 12c is stopped to terminate the plasticization and measurement by the backflow of the resins of color C.

Figure 2C:
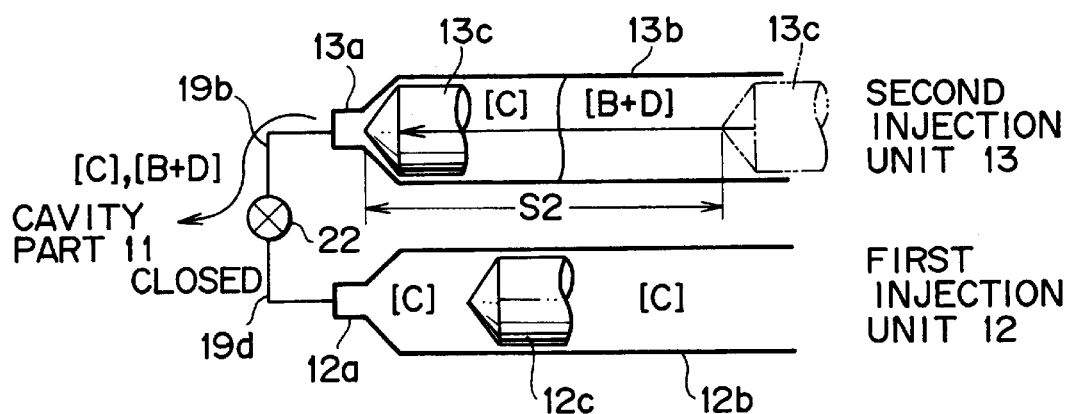

Next, as shown in FIG. 2C, after the flow path for a core layer 19d is placed in a closed state, the screw 13c of the second injection unit 13 is moved forward. When the screw 13c moves forward, the resins of color C on the nozzle part 13a side are press fitted into the cavity part 11, and after the total quantity of the resins of color C have been press fitted, the mixed resins of colors B–D are then press fitted. In this case, as shown in FIG. 3A, the resins of color C press fitted into the cavity part 11 are cooled from the wall surface side of the cavity part 11 and solidified, and the mixed resins of colors B–D press fitted next flow along the soft inner portion of the resins of color C and are forced deeply into the cavity part 11 in a state of containing the mixed resins of colors B–D. Accordingly, when the total quantity of the resins of color C and the resins of colors B–D is press fitted into the cavity part 11, there assumes a state of a 3-layer construction that the resins of color C are present on both sides of the mixed resins of colors B–D, thus obtaining the third variety (color C) of the molded products in which the mixed resins of colors B–D are covered with the resins of color C.

And, the third variety (color C) of the molded products are produced sequentially by repeating such an operation as described, and when a judgment is made on the basis of the shot number or the like that all the mixed resins of colors B–D in the second injection unit 13 are used up, the present fourth control operation is terminated. Thereafter, the control device is caused to execute the aforementioned first control operation to thereby cause the first injection unit 12 to carry out injection molding by the resins of color C.

Figure 8:
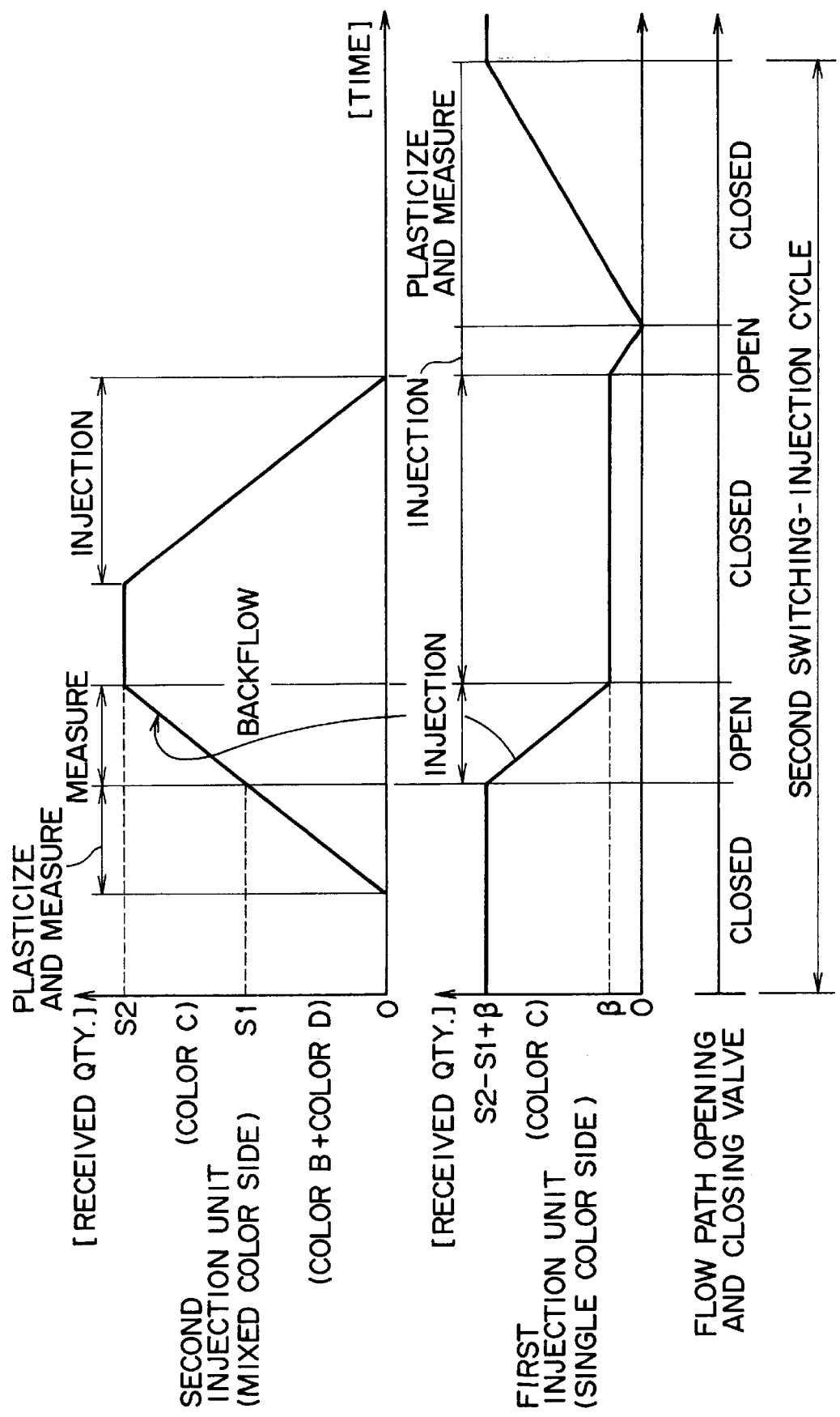
FIG. 8 is an explanatory view showing the operating state of the injection molding machine according to the present invention.

While in the aforementioned fourth control operation, the resins of color C is reversed to the second injection unit 13 by making use of pressure when the screw 12c of the first injection unit 12 is rotated to plasticize the resins of color C, as shown in FIGS. 2A to 2C, it is to be noted that the invention is not limited thereto but as shown in FIG. 8, the resins of color C may be reversed to the second injection unit 13 by making use of injection pressure caused by the forward and backward movement of the screw 12c.

Figure 9A:
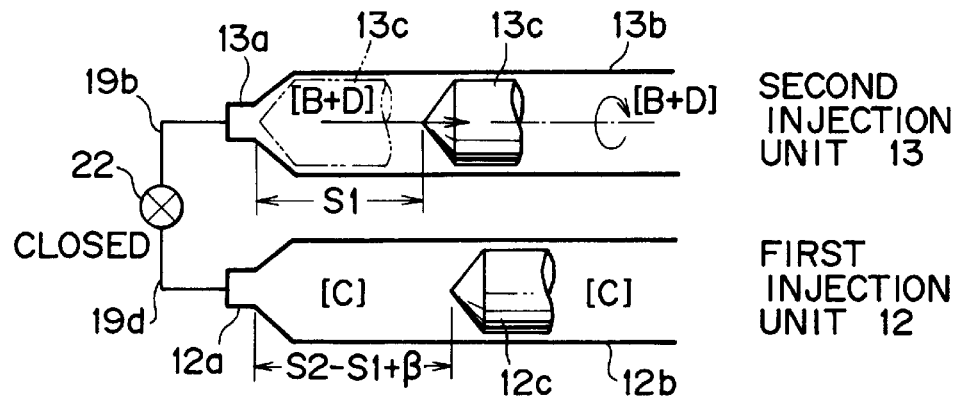
FIGS. 9A to 9C are explanatory views showing the process of injection molding, FIG. 9A, FIG. 9B, and FIG. 9C showing the state of plasticizing and measuring B–D color mixed resins, the state of reversely flowing C color resins, and the state of injecting C color resins and B–D color mixed resins, respectively.
Figure 9B:
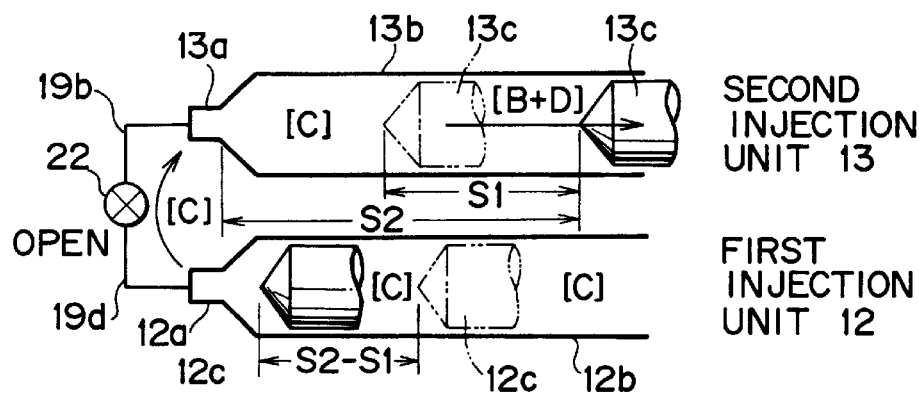

That is, as shown in FIG. 9A, a screw 13c in the second injection unit 13 is rotated to thereby plasticize and measure the mixed resins of colors B–D for a shot portion (received quantity S1) corresponding to the core layer. Thereafter, as shown in FIG. 9B, the flow path for a core layer 19d is opened to move forward the screw 12c in the first injection unit 12 whereby the resins of color C for a shot portion (received quantity S2–S1) corresponding to the skin layer is reversed to the second injection unit 13 from the first injection unit 12.

Figure 9C:
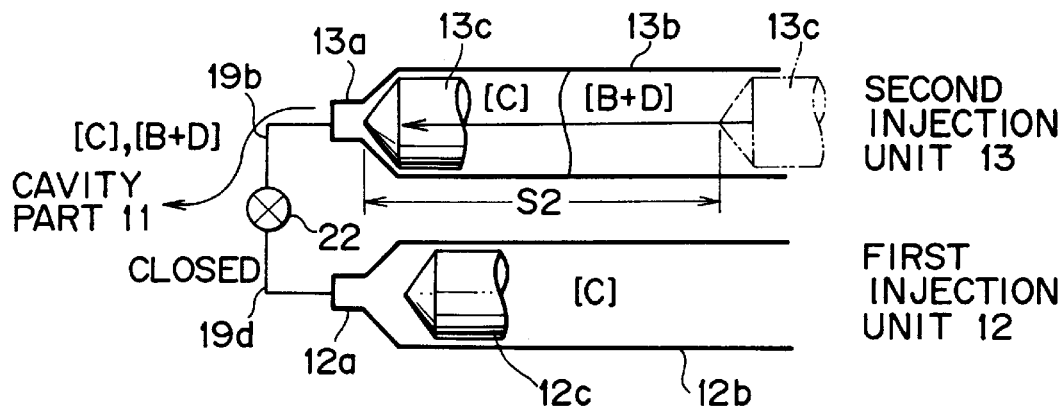
Figure 10A:
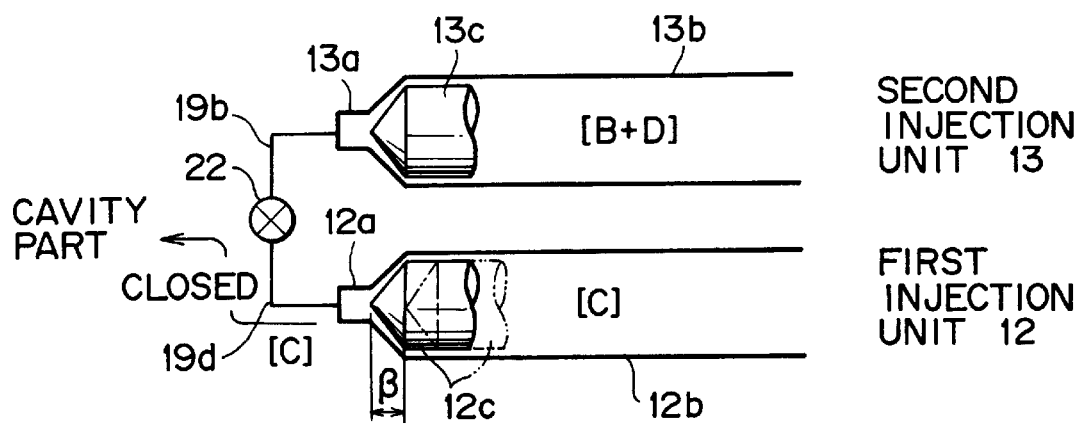
FIGS. 10A and 10B are explanatory views showing the process of injection molding, FIG. 10A and FIG. 10B showing the state of injecting C color resins and the state of plasticizing and measuring C color resins, respectively.
Figure 10B:
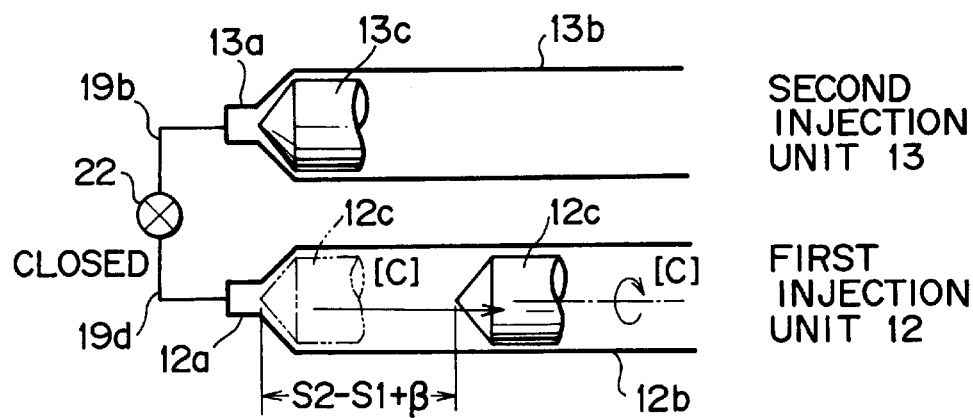

Next, as shown in FIG. 9C, the resins of color C and the mixed resins of colors B–D for one shot portion (received quantity S2) are received in the second injection unit 13, after which the screw 13c is moved forward whereby the resins of color C and the mixed resins of colors B–D are injected into the cavity part 11 in that order. Thereafter, as shown in FIG. 10A, the screw 12c of the first injection unit 12 is further moved forward to thereby press fit the resins of color C for a fixed shot portion (received quantity β) into the cavity part 11. Thereby, the exposure of the mixed resins on the inlet side of the cavity part 11 is completely covered with the resins of color C. Thereafter, as shown in FIG. 10B, the screw 12c of the first injection unit 12 is rotated to plasticize and measure the resins of color C for a next portion.

As described above, the injection molding method according to the present embodiment selectively carries out a normal molding operation in which injection units 12 and 13 are connected together which measures resins while plasticizing the latter and injects into a cavity part 11, and only desired resins in one of the injection units 12 and 13 are injected into the cavity part 11 to thereby mold a single layer molded product, and a multilayer molding operation in which mixed resins formed when resins are changed in one of the injection units 12 and 13 are injected into the cavity part 11 so as to constitute a core layer, and desired resins in the other of the injection units 13 and 12 are injected into the cavity part 11 so as to constitute a skin layer thereby molding a molded product of a 3-layer construction.

More specifically, in the multilayer molding operation according to the fourth control operation, the resins can be fed and received between the injection units 12 and 13 whereby in one the second injection unit 13, the mixed resins are plasticized and measured so as to provide a shot portion corresponding to the core layer, and in the other first injection unit 12, the desired resins are plasticized, after which the resins are fed to the second injection unit 13 so as to provide a shot portion corresponding to the skin layer, and the desired resins of color C and mixed resins of colors B–D are injected into the cavity part 11 in that order to thereby mold the molded products of a 3-layer construction. While in the present embodiment, a description has been made of the case where the resins of color C and the mixed resins of colors B–D are injected from the second injection unit 13 to provide the molded products by the fourth control operation, it is to be noted that in both the first injection unit 12 and the second injection unit 13, the multilayer molding operation by the fourth control operation may be carried out.

According to the aforementioned constitution, when the mixed resins are formed due to the change in resins, the operation is shifted to the multilayer molding operation for molding the molded products of a 3-layer construction in which the mixed resins are used for the core layer to thereby obtain the molded products having the surface of the skin layer formed of the desired resins without appearance of the inconvenience caused by the mixed resins on the surface of the molded products. Since the molding of the molded products is carried out by injecting them outside the machine, it can be carried out together with the changing operation of the resins. Thereby, since the molded products can be obtained using the mixed resins together with the changing operation of the resins, the loss of materials can be reduced and the molded products can be obtained at less cost by the enhancement of the machine working rate in the actual molding as compared with the case where a large quantity of resins (mixed resins) are abandoned taking much time as in prior art.

Further, the molded products were actually molded under various molding conditions such as the shape of the molded products, the specification of the metal molds, the wall-thickness of the molded products and the like by the injection molding method according to the present embodiment. It was then confirmed that the quantity capable of filling as the core layer is in the range of 5 to 65% relative to the total weight, as shown in FIG. 12.

(Embodiment 2)

A second embodiment of the present invention will be described hereinafter with reference to FIGS. 13 to 15. For the convenience of description, the same members as those of Embodiment 1 are indicated by the same reference numerals, explanation of which is omitted.

Figure 13:
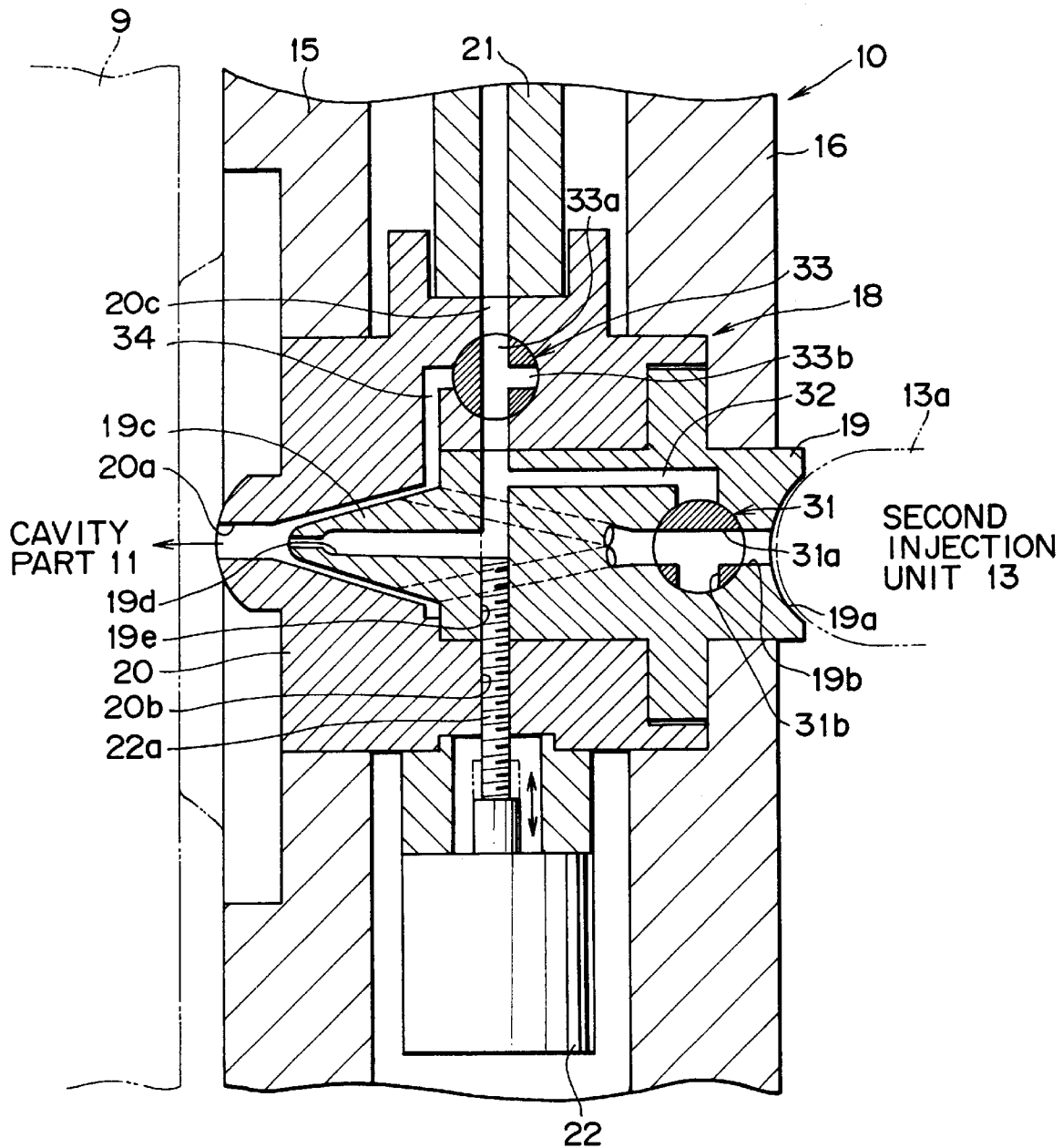
FIG. 13 is a sectional view of main parts of the injection unit connecting device in an enlarged scale.

The injection molding machine according to the present embodiment has, as shown in FIG. 13, an injection unit connecting device 10 for connecting a first injection unit 12 to a second injection unit 13. The injection unit connecting device 10 has a metal mold joining plate 15, a fixed plate 16, and a resin layer forming mechanism 18 provided between the metal mold joining plate 15 and the fixed plate 16.

The resin layer forming mechanism 18 has a male-side laminate member 19, a female-side laminate member 20, a resin introducing member 21, and a flow path opening and closing valve 22. The male-side laminate member 19 has a second switching valve 31 provided between an inlet of a flow path for a skin layer 19b and a branch path, and a second bypass path 32 formed so as to provide a communication between the second switching valve 31 and the flow path for a skin layer 19b. The second switching valve 31 has a linearly formed main conduction path 31a, and a sub-conduction path 31b formed at light angles to the center of the main conduction path 31a, the second switching valve 31 capable of being rotated in normal and reverse directions by 90° of these conduction paths 31a and 31b. In the second switching valve 31, when assuming the normal attitude rotated in the normal direction, an inlet side and a branch path side of the flow path for a skin layer 19b are communicated and the second bypass path 32 is closed by the main conduction path 31a, whereas when assuming the reverse attitude rotated in the reverse direction, as shown in FIG. 14, an inlet side of the flow path 19b for a skin layer 19b and the second bypass path 32 are communicated and the branch path side of the flow path for a skin layer 19b is closed by the main conduction path 31a and the sub-conduction path 31b.

Further, as shown in FIG. 13, the female-side laminate member 20 has a first switching valve 33 provided in the flow path for a core layer 20c, and a first bypass path 34 so formed as to provide a communication between the first switching valve 33 and the gathering path 20a. The first switching valve 33 has a linearly formed main conduction path 33a, and a sub-conduction path 33b formed at right angles to the center of the main conduction path 33a, the first switching valve 33 capable of being rotated in the normal and reverse directions by 90° of the conduction paths 33a and 33b. In the first bypass path 34, when assuming the normal attitude rotated in the normal direction, an inlet side of the flow path for a core layer 20c and an end of the gathering path 20a are communicated and an outlet side of the flow path for a core layer 20c is closed by the main conduction path 33a, whereas when assuming the reverse attitude rotated in the reverse direction, as shown in FIG. 14, an inlet side and an outlet side of the flow path 20c for a core layer 20c are communicated and the first bypass path 34 is closed by the main conduction path 33a and the sub-conduction path 33b.

The second switching valve 31 and the first switching valve 33 are controlled in switching between the normal attitude and the reverse attitude by a control device not shown. The control device is capable of executing a fifth control operation (normal molding operation) for injecting only the resins in the first injection unit 12 into the cavity part 11 to mold a single layer molded product, a sixth control operation multilayer molding operation) for molding molded products of a 3-layer construction with mixed resins in the first injection unit 12 and resins in the second injection unit 13 as a core layer and a skin layer, respectively, a seventh control operation (normal molding operation) for injecting only the resins in the second injection unit 13 into the cavity part 11 to mold molded products, an eighth control operation multilayer molding operation) for molding molded products of a 3-layer construction with mixed resins in the first injection unit 12 and mixed resins in the second injection unit 13 as a skin layer and a core layer, respectively. Other constitutions are the same as those of Embodiment 1.

In the above-described constitution, the operation of the injection molding machine will be described below. While in the following description, a description will be made of the case where colors of resins and pigments are changed in order of color A, color B, color C, and color D to thereby change the varieties (colors), it is to be noted that the present invention is not limited thereto, but can be also applied to the case where kinds of resins are changed to thereby change the varieties (performance, quality, etc.) of molded products.

First, resins of color A used for the first variety of molded products are charged into the hopper of the first injection unit 12. Then, when a fixed quantity of the resins of color A is charged, a molding start switch not shown is depress fitted to thereby execute the first control operation by the control device to allow the first injection unit 12 to carry out injection molding. In this injection molding, resins of color B used for the second variety of molded products are then charged into the hopper of the second injection unit 13.

Figure 14:
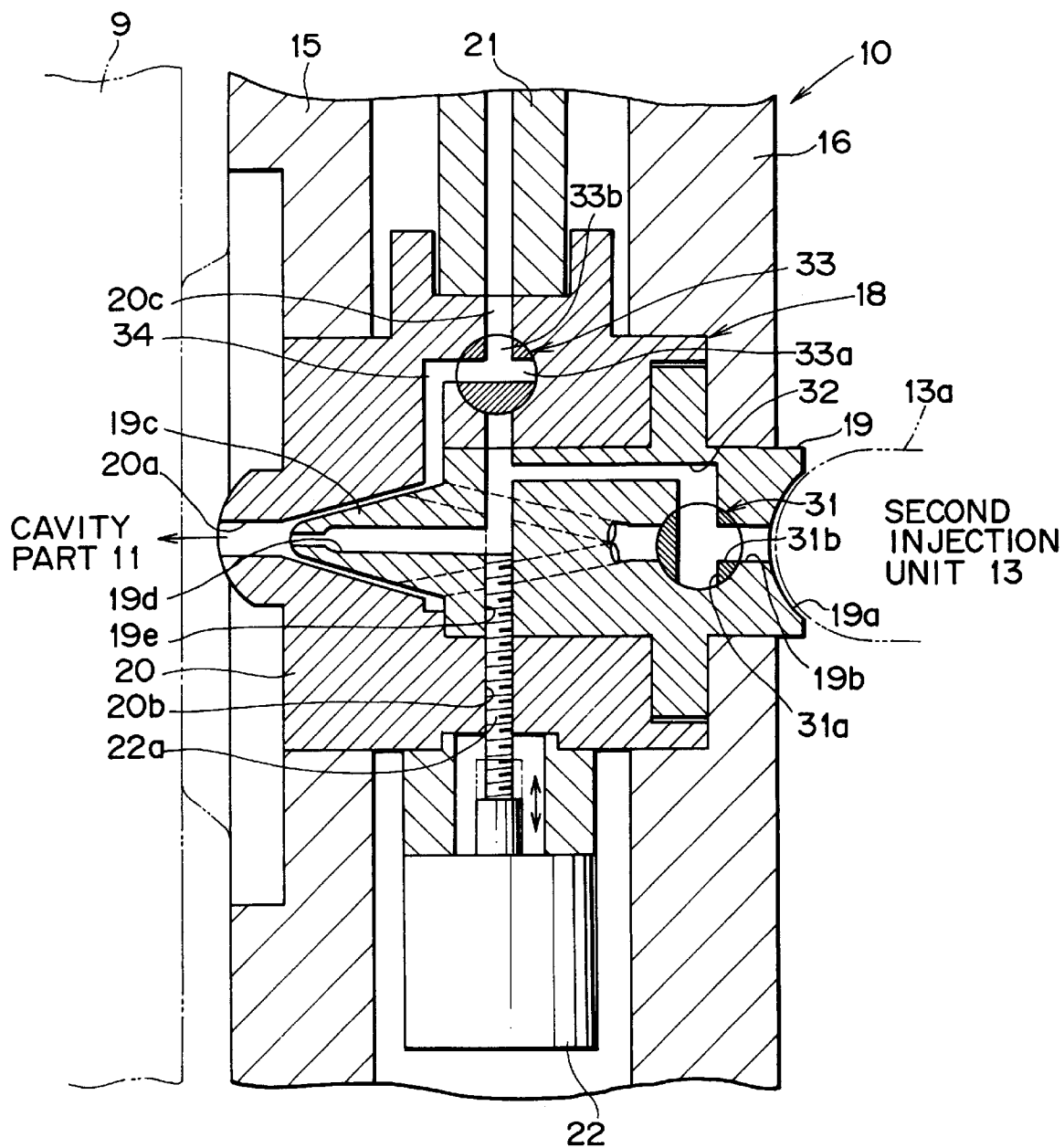
FIG. 14 is a sectional view of main parts of the injection unit connecting device in an enlarged scale.

When the above-described fifth control operation is executed, the first switching valve 33 and the second switching valve 31 are rotated so as to assume the reverse attitude, as shown in FIG. 14. The flow path for a core layer 20c and the gathering path 20a are communicated through the first switching valve 33 and the first bypass path 34, and the flow path for a skin layer 19b and the flow path for a core layer 19d are communicated through the second switching valve 31 and the second bypass path 32. In order to prevent, when the resins of color A are injected out of the first injection unit 12, the resins of color A from reversing to the second injection unit 13 through the flow path for a core layer 19d and the second bypass path 32 or the like, the closed member 22a of the flow path opening and closing valve 22 is moved forward to thereby place the flow path for a core layer 19d in a closed state.

Next, in the first injection unit 12, the resins of color A are plasticized and measured so as to provide one shot portion to inject them. The resins of color A flow, after flowing into the flow path for a core layer 20c, into the first bypass path 34 through the sub-conduction path 33b of the first switching valve 33 and the main conduction path 33a, and further flow into the cavity part 11 through the gathering path 20a. When in the cavity part 11, the resins of color A are cooled while holding them to have the mold holding properties after passage of the fixed cooling time, both the metal molds 8 and 9 are opened to take out the molded products merely formed of the resins of color A. During the period of cooling, the resins of color A for a next shot portion are plasticized and measured by the aforementioned operation, and when the cavity part 11 is formed by clamping, they are injected. By repeating such an operation as described, the molded products of a single layer merely formed of the resins of color A are produced sequentially.

Next, the production of molded products of the first variety (color A) by the first injection unit is changed to the production of molded products of the second variety (color B) by the second injection unit, and preparation is made so that molding products of the third variety (color C) can be produced in the first injection unit.

A That is, after the resins of color C have been charged into the hopper of the first injection unit 12 which have received the resins of color A, the control device is caused to execute the sixth control operation. When the control device executes the sixth control operation, first, the second switching valve 31 and the first switching valve 33 are rotated to assume the normal attitude. Then, the flow path for a skin layer 19b is placed in a conduction state through the main conduction path 31a of the second switching valve 31, and the flow path for a core layer 20c is placed in a conduction state through the main conduction path 33a of the first switching valve 33.

Next, in the first injection unit 12, the mixed resins of colors A–C in which the resins of color A remained in the hopper and the resins of color C newly charged are mixed are plasticized and measured so as to provide a shot portion corresponding to a core layer positioned in the middle portion of the molded products of a 3-layer construction. Further, in the second injection unit 13, the resins of color B are plasticized, and the resins of color B are measured so as to provide a shot portion corresponding to the skin layer positioned on the surface side and the back side of the molded products of a 3-layer construction.

Figure 15:
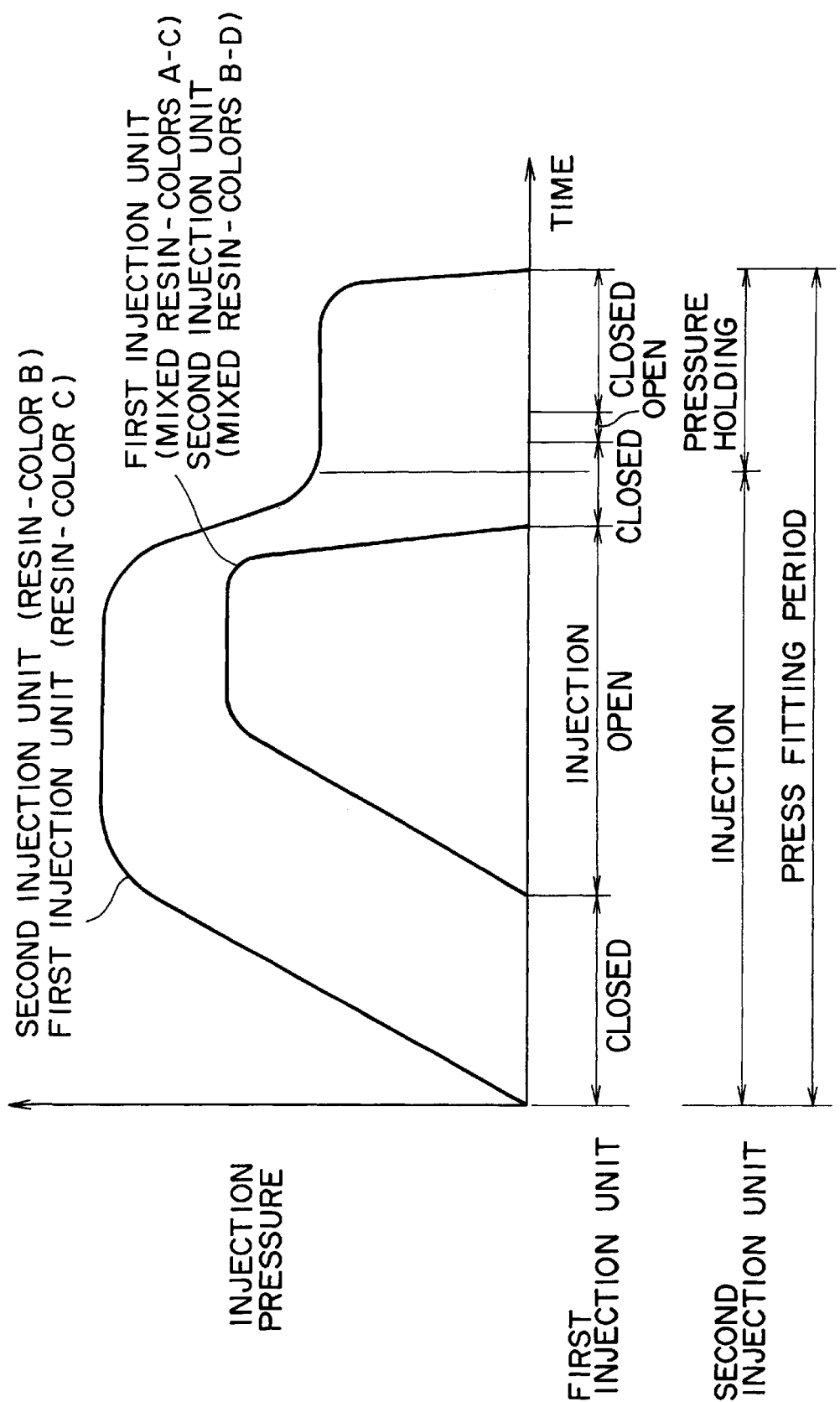
FIG. 15 is an explanatory view showing the press fitting state by each injection unit.
Figure 16:
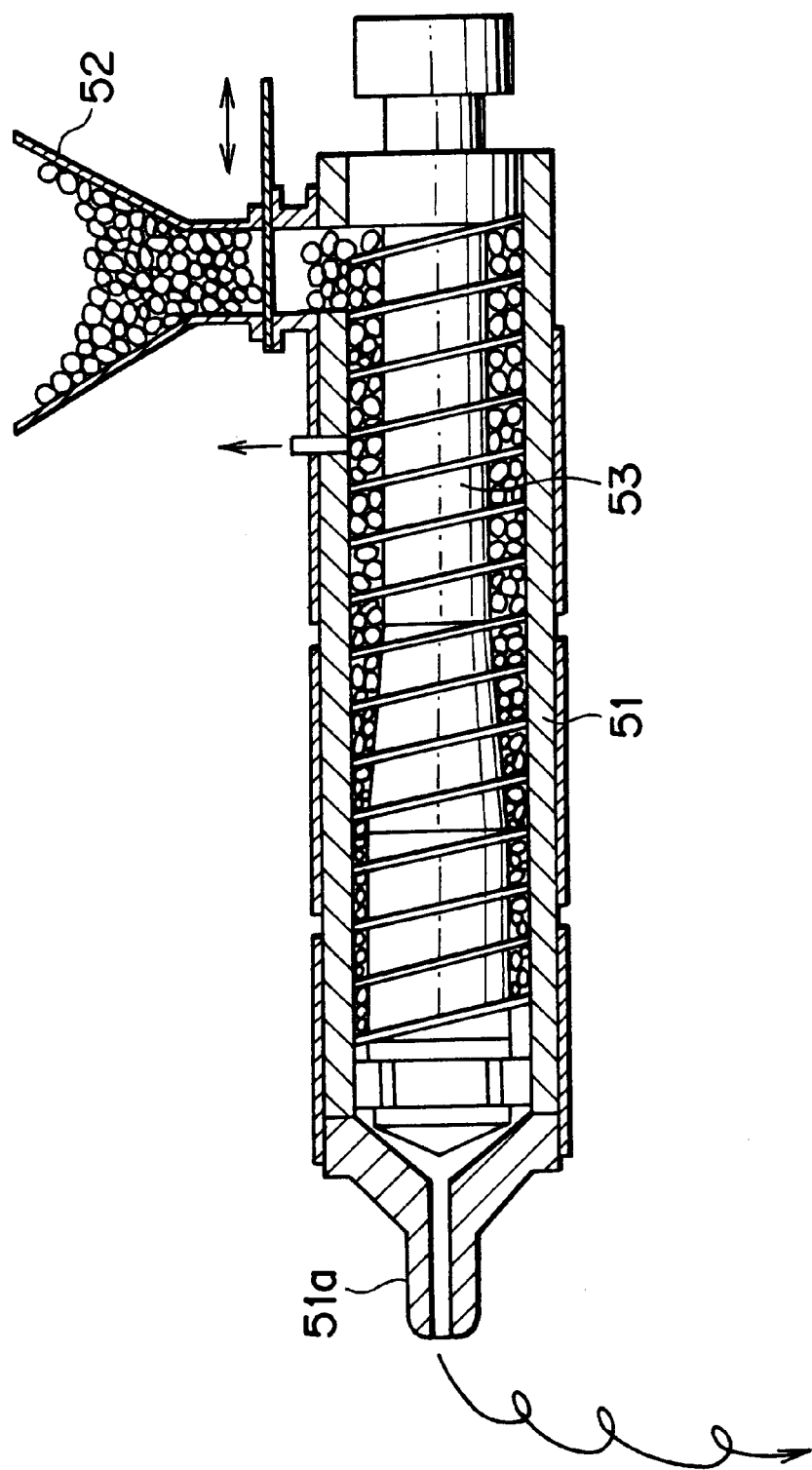
FIG. 16 is a schematic constituent view of a conventional injection molding machine.

Thereafter, as shown in FIG. 15, the resins of color B are injected from the second injection unit 13 prior to the mixed resins of colors A–C in the first injection unit 12. The resins of color B injected out of the second injection unit 13 flow into the flow path for a skin layer 19b, pass through the main conduction path 31a of the second switching valve 31, and thereafter move forward while being branched in plural directions in the flow path for a skin layer 19b. The resins of color B further move forward through the flow path for a skin layer 19b, thereby flow into a clearance between the inclined convex part 19c of the male-side laminate member 19 and the gathering path 20a of the female-side laminate member 20, and flow in the direction of the fixed metal mold 9 while completely covering the inclined wall surface of the inclined convex part 19c.

On the other hand, after passage of the fixed waiting time after the resins of color B have been injected, the closed member 22a of the flow path opening and closing valve 22 is moved backward to thereby place the flow path for a core layer 19d in an open state. The mixed resins of colors A–C are injected under lower pressure than injection pressure from the first injection unit 12. The mixed resins of colors A–C flow into the female-side laminate member 20, the main conduction path 33a of the first switching valve 33, and the flow path for a core layer 19d of the male-side laminate member 19 through the resin introducing member 21, are bended in moving direction by the extreme end of the closed member 22a, and thereafter flow out of the extreme end of the inclined convex part 19c. At that time, at the extreme end of the inclined convex part 19c, the resins of color B previously injected gather along the inclined wall surface of the inclined convex part 19c. Accordingly, the mixed resins of colors A–C flown out of the extreme end of the inclined convex part 19c pass through the gathering path 20a together with the resins of color B, while being completely covered in the periphery thereof with the resins of color B, and are press fitted into the cavity part 11 of the fixed metal mold 9.

Thereafter, the mixed resins of colors A–C and the resins of color B are press fitted in unit of fixed quantity so that press fitting of the mixed resins of colors A–C is finished earlier than that of the resins of color B, and when injection molding for one shot portion is completed, the closed member 22a of the flow path opening and closing valve 22 is moved forward to thereby place the flow path for a core layer 19d in a closed state. Thereafter, the flow path for a core layer 19d is placed in an open state temporally, and the resins of color B and the mixed resins of colors A–C in the cavity part 11 are cooled under the injection pressure of the first injection unit while holding pressure, after which the molded products of a 3-layer construction in which the mixed resins of colors A–C is covered with the resins of color B are taken out. By repeating the operation as described above, the second variety (color B) of the molded products of a 3-layer construction in which the mixed resins of colors A–C is covered with the resins of color B are produced sequentially.

Thereafter, where a judgment is made on the basis of the shot number or the like that all the mixed resins of colors A–C in the first injection unit 12 are used up, the present sixth control operation is terminated, and the seventh control operation for molding the molded products of a single layer merely formed of the resins of color B in the second injection unit 13 is carried out.

That is, the flow path for a core layer 19d is placed in a closed state so that the resins of color B from the second injection unit 13 is not reversed. It is noted that the screw position of the first injection unit 12 may be set to the extreme end to thereby prevent the back flow. Thereafter, in the second injection unit 13, the resins of color B for one shot portion are injected after plasticization and measurement whereby the resins are press fitted into the cavity part 11 through the flow path for a skin layer 19b, and when the mold holding properties are provided after passage of the fixed cooling time, the molded products merely formed of the resins of color B are taken out. By repeating such an operation as described, the molded products merely formed of the resins of color B are produced sequentially.

Next, the production of molded products of the second variety (color B) by the first injection unit is changed to the production of molded products of the third variety (color C) by the second injection unit 13, and preparation is made so that molded products of the fourth variety (color D) can be produced in the second injection unit 13.

That is, after the resins of color D have been charged into the hopper of the second injection unit 13 which have received the resins of color B, the control device is caused to execute the seventh control operation. When the control device executes the seventh control operation, the second switching valve 31 and the first switching valve 33 are rotated to assume the reverse attitude. Then, the flow path for a skin layer 19b and the flow path for a core layer 19d are communicated through the second switching valve 31 and the second bypass path 32, and the flow path for a core layer 20c and the gathering path 20a are communicated through the first switching valve 33 and the first bypass path 34. In order that when the resins of color C are injected form the first injection unit 12, the resins of color C are not reversed to the second injection unit 13 through the flow path for a core layer 19d and the second bypass path 32 or the like, the closed member 22a of the flow path opening and closing valve 22 is moved forward to thereby place the flow path for a core layer 19d in a closed state.

Next, in the first injection unit 12, the resins of color C are plasticized and the resins of color B are measured so as to provide a shot portion corresponding to a skin layer positioned on the surface side and on the back side of the molded products of a 3-layer construction. Further, in the second injection unit 13, the resins of colors B–D in which the resins of color B remained in the hopper and the resins of color D charged newly are plasticized, and measured so as to provide a shot portion corresponding to the core layer positioned in the middle portion of the molded products of a 3-layer construction.

Thereafter, the resins of color C are injected from the first injection unit 12 prior to the mixed resins of colors B–D in the second injection unit 13. The resins of color C injected out of the first injection unit 12 flow into the flow path for a core layer 20c, pass through the sub-conduction path 33b and the main conduction path 33a of the first switching valve 33, and thereafter flow into the first bypass path 34. The resins of color C further move forward through the first bypass path 34, thereby flow into a clearance between the inclined convex part 19c of the male-side laminate member 19 and the gathering path 20a of the female-side laminate member 20, and flow in the direction of the fixed metal mold 9 while completely covering the inclined wall surface of the inclined convex part 19c.

On the other hand, after passage of the fixed waiting time after the resins of color C have been injected, the closed member 22a of the flow path opening and closing valve 22 is moved backward to thereby place the flow path for a core layer 19d in an open state. The mixed resins of colors B–D are injected under lower pressure than injection pressure of the resins of color C from the first injection unit 12. The mixed resins of colors B–D flow into the flow path for a core layer 19d through the flow path for a core layer 19d and the second switching valve 31 and the second bypass path 32. The resins are bended in moving direction by the extreme end of the closed member 22a, and thereafter flow out of the extreme end of the inclined convex part 19c. At that time, at the extreme end of the inclined convex part 19c, the resins of color C previously injected gather along the inclined wall surface of the inclined convex part 19c. Accordingly, the mixed resins of colors B–D flown out of the extreme end of the inclined convex part 19c pass through the gathering path 20a together with the resins of color C, while being completely covered in the periphery thereof with the resins of color C, and are press fitted into the cavity part 11.

Thereafter, the mixed resins of colors B–D and the resins of color C are press fitted in unit of fixed quantity so that press fitting of the mixed resins is finished earlier than that of the resins of color C, and when injection molding for one shot portion is completed, the closed member 22a of the flow path opening and closing valve 22 is moved forward to thereby place the flow path for a core layer 19d in a closed state. Thereafter, the flow path for a core layer 19d is placed in an open state temporally, and the resins of color C and the mixed resins of colors B–D in the cavity part 11 are cooled under the injection pressure of the second injection unit 13 while holding pressure, after which the molded products of a 3-layer construction in which the mixed resins of colors B–D is covered with the resins of color C are taken out. By repeating the operation as described above, the third variety (color C) of the molded products of a 3-layer construction in which the mixed resins of colors B–D is covered with the resins of color C are produced sequentially.

Thereafter, where a judgment is made on the basis of the shot number or the like that all the mixed resins of colors B–D in the second injection unit 13 are used up, the present seventh control operation is terminated, and the eighth control operation for molding the molded products by the resins of color C in the first injection unit 12.

That is, the flow path for a core layer 19d is placed in a closed state so that the resins of color C from the first injection unit 12 is not reversed. It is noted that the screw position of the second injection unit 13 may be set to the extreme end to thereby prevent the back flow. Thereafter, in the first injection unit 12, the resins of color C for one shot portion are injected after plasticization and measurement whereby the resins are press fitted into the cavity part 11 through the first switching valve 33 and the first bypass path 34 or the like, and when the mold holding properties are provided after passage of the fixed cooling time, the molded products merely formed of the resins of color C are taken out. By repeating such an operation as described, the molded products merely formed of the resins of color C are produced sequentially.

As described above, the injection molding machine according to the present embodiment comprises an injection unit connecting device 10 for connecting injection units 12 and 13 together for measuring resins while plasticizing the latter to inject them into a cavity part 11; and a control device for selectively carrying out a normal molding operation for injecting only the desired resins in one of the injection units 12 and 13 into the cavity part 11 to thereby mold a single layer molding product, and a multilayer molding operation for injecting mixed resins formed when resins in one of the injection units 12 and 13 is changed to the cavity part 11 so as to be a core layer and injecting the desired resins in the other of the injection units 13 and 12 into the cavity part 11 so as to be a skin layer to thereby mold molded products of a 3-layer construction. The injection unit connecting device 10 comprises a flow path for a core layer 19d used for forming the core layer, a flow path for a skin layer 19b used for forming the skin layer, and a switching mechanism (a first switching valve 33, a first bypass path 34, a second switching valve 31 and a second bypass path 32) for connecting the injection units 12 and 13 capable of changing to either the flow path for a core layer 19d or the flow path for a skin layer 19b. The control device controls the switching mechanism so that in the multilayer molding operation, one of the injection units is connected to the flow path for a core layer, and the other of the injection units is connected to the flow path for a skin layer.

According to the above-described constitution, the mixed resins are measured so as to provide a shot portion corresponding to a core layer while plasticizing the former in one of the injection units 12 and 13, the one of the injection units 12 and 13 is connected to the flow path for a core layer 19d, and the desired resins are measured so as to provide a shot portion corresponding to a skin layer while plasticizing the former in the other of the injection units 13 and 12, the other of the injection units 13 and 12 is connected to the flow path for a skin layer 19b. Thereafter, the mixed resins in one of the injection units 12 and 13 and the desired resins in the other of the injection units 13 and 12 are respectively injected into the cavity part 11 through the flow path for a core layer 19d and the flow path for a skin layer 19b to thereby mold the molded products of a 3-layer construction. With this, the molded products of a 3-layer construction with the mixed resins in one of the injection units 12 and 13 being a core layer can be easily obtained by the simple operation of switching the connecting state of the injection units 12 and 13 with respect to the flow path for a core layer 19d and the flow path for a skin layer 19b.

While in the above-described first and second embodiments, a description has been made of the case of changing colors of the resins, the invention is not limited thereto but can be also applied to the case where resins are changed between resins having the compatibility, as given in Table 1.

TABLE 1

O: suitable    X: unsuitable

| RESIN | ABS | AS | EVA | PA6 | PA66 | PC | HD-PE | LD_PE | PMMA | POM | PP | PPO | PS-GP | PS-HI | PVC |
|---|---|---|---|---|---|---|---|---|---|---|---|---|---|---|---|
| ABS | O | O | | | | O | X | X | O | | X | | X | X | |
| AS | O | O | O | | | | | | | | X | | | | |
| EVA | | O | O | | | | O | O | | | O | | O | | |
| PA6 | | | | O | O | | X | X | | | X | | | X | |
| PA66 | | | | O | O | X | X | X | | | X | | | X | |
| PC | O | | | | | X | O | | | | | | X | | |
| HD-PE | X | | O | X | X | | O | O | X | X | | | X | | X |
| LD-PE | X | | O | X | X | | O | O | X | X | O | | X | | |
| PMMA | O | | | | | | X | X | O | | X | | X | | O |
| POM | | | | | | | X | X | | O | X | | | | |
| PP | X | X | O | X | X | | | O | X | X | O | X | X | X | X |
| PPO | | | | | | | | | | | X | O | O | O | |
| PS-GP | X | | O | | | X | X | X | X | | X | O | O | O | X |
| PS-HI | X | | | X | X | | | | | | X | O | O | O | X |
| PVC | | | | | | | X | | O | | X | | X | X | O |

What is claimed is:

1. An injection molding process comprising:

providing a multi-injection unit injection molding machine and performing different molding operations including performing a first single layer molding operation including
injecting a first resin from a first injection unit into a mold cavity to form a single layer part,
removing the single layer part;
performing a second multi-layer molding operation including
adding a second resin to the first resin to form a mixed resin mixture in said first injection unit, then
forming the skin layer of a multi-layer part by injecting at least one additional resin from at least a second injection unit into the mold cavity to form a skin layer of the multi-layer part, then injecting the mixed resin mixture from the first injection unit into the mold cavity to form the core layer of the multi-layer part,
wherein the mixed resin mixture is not visible on the skin layer of the multi-layer part and removing the multi-layer part.

2. The process of claim 1, further comprising
performing the second molding operation until the resin mixture is consumed, and then
injecting the second resin into the mold cavity to form a single layer part.

3. The process of claim 1, wherein the first resin, second resin and the at least one additional resin have different colors.

4. The process of claim 1, wherein one or more of the first resin, second resin, or the at least one additional resin are different kinds of resins.

5. The process of claim 1, wherein the first molding operation to produce a single layer part is changed to the second molding operation to form a multilayer part, without purging.

6. The process of claim 1, further comprising
cooling the mold cavity after forming the single layer or multilayer part.

7. The process of claim 1, further comprising
adding a second additional resin to the at least one additional resin to form a second resin mixture, then
injecting the second resin into the mold cavity to form the skin of a multilayer part, and then
injecting the second resin mixture from the second injection unit into the mold cavity to form the core of a second multilayer part.

8. The process of claim 1, wherein the resin mixture is plasticized while the at least one additional resin is injected.

9. The process of claim 1, wherein the core layer of the multilayer part is from 5–65% by weight of the total weight of the part.

10. The process of claim 1, wherein the second resin is added to the first resin by adding the second resin to a hopper connected to the first injection unit,
wherein the hopper contains the first resin.

* * * * *